(12) United States Patent
Haaland et al.

(10) Patent No.: US 10,521,526 B2
(45) Date of Patent: Dec. 31, 2019

(54) HYBRID METHOD OF ASSESSING AND PREDICTING ATHLETIC PERFORMANCE

(71) Applicant: NFL PLAYERS, INC., Washington, DC (US)

(72) Inventors: Peter D. Haaland, Belmont, MA (US); Sean C. Sansiveri, Venice, CA (US); Anthony J. Falcone, Hollis, NH (US)

(73) Assignee: NFL PLAYERS, INC., Washington, DC (US)

( * ) Notice: Subject to any disclaimer, the term of this patent is extended or adjusted under 35 U.S.C. 154(b) by 7 days.

(21) Appl. No.: 15/818,319

(22) Filed: Nov. 20, 2017

(65) Prior Publication Data

US 2019/0155969 A1   May 23, 2019

(51) Int. Cl.
*G06F 17/50*   (2006.01)
*G06F 17/18*   (2006.01)
(Continued)

(52) U.S. Cl.
CPC .......... *G06F 17/5009* (2013.01); *G06F 17/18* (2013.01); *G06Q 10/0639* (2013.01);
(Continued)

(58) Field of Classification Search
CPC  G06N 3/08; G06N 3/04; G06N 3/063; G06N 3/082; G06N 99/005
(Continued)

(56) References Cited

U.S. PATENT DOCUMENTS

2016/0307335 A1* 10/2016 Perry ...................... G06T 7/292

2016/0367188 A1* 12/2016 Malik ................... A61B 5/682
(Continued)

FOREIGN PATENT DOCUMENTS

WO            WO         1/2019
     PCT/US2018/061358

OTHER PUBLICATIONS

Guo et al.—Energy-Efficient Hybrid Analog/Digital Approximate Computation in Continuous Time—https://ieeexplore.ieee.org/stamp/stamp.jsp?tp=&arnumber=7463004 (Year: 2016).*
(Continued)

*Primary Examiner* — Scott A. Waldron
*Assistant Examiner* — Viker A Lamardo
(74) *Attorney, Agent, or Firm* — One LLP; Joseph K. Liu

(57) ABSTRACT

Exemplary systems, apparatus, and methods for evaluating and predicting athletic performance are described. Systems may include a receiver that gathers non-deterministic data on one or more aspects of athletic performance, a deterministic model of the athletic performance, a hybrid processor that creates a conditional probabilistic model from these elements, and a display presenting the evaluated or predicted performance. The system may include sensors affixed to an athlete or their equipment to convey position, acceleration, heart rate, respiration, biomechanical attributes, and detached sensors to record video, audio, and other ambient conditions. Apparatus may include a hybridization processor that communicates the output of conditional probabilistic models directly to athletes, coaches, and trainers using sound, light, or haptic signals, or to spectators using audio-visual enhancements to broadcasts. The methods enable more accurate evaluations and predictions of athletic performance than are possible with either statistical or deterministic methods alone.

20 Claims, 22 Drawing Sheets

(51) Int. Cl.
G06Q 10/06 (2012.01)
G06N 3/04 (2006.01)

(52) U.S. Cl.
CPC ...... *G06F 2217/06* (2013.01); *G06F 2217/16* (2013.01); *G06N 3/0427* (2013.01)

(58) Field of Classification Search
USPC .......................................................... 706/25
See application file for complete search history.

(56) References Cited

U.S. PATENT DOCUMENTS

| 2017/0070797 | A1 | 3/2017 | Spector et al. | |
|---|---|---|---|---|
| 2017/0094326 | A1* | 3/2017 | Arimilli | H04N 21/23439 |
| 2017/0193140 | A1* | 7/2017 | Brothers | G06K 9/00557 |

OTHER PUBLICATIONS

Spearman et al.—"Physics-Based Modeling of Pass Probabilities in Soccer"—2017—http://www.sloansportsconference.com/wp-content/uploads/2017/02/1621.pdf (Year: 2017).*

Pro Football Reference. Retrieved from https://www.pro-football-reference.com/ on Nov. 20, 2017.

Association of Tennis Professionals. Retrieved from https://www.atptour.com/ on Nov. 20, 2017.

Krengel, K. S., "Influence of Athlete Heart Rate, Rate of Perceived Exertion, and Anxiety in Rowing Practice and Competition", Eastern Michigan University, Mar. 17, 2014, pp. 1-65.

Bashiri, M., et al., "Tuning the Parameters of an Artificial Neural Network Using Central Composite Design and Genetic Algorithm", Scientia Iranica, 2011, vol. 18, No. 6, pp. 1600-1608.

Ding, S., et al., "Evolutionary Artificial Neural Networks: A Review", Artificial Intelligence Review, 2013, vol. 39, pp. 251-260, Springer Science+Business Media B.V.

Guo, N. "Energy-Efficient Hybrid Analog/Digital Approximate Computation in Continuous Time, IEEE Journal of Solid State Circuits". Jul. 2016. vol. 51, Issue 7.

Huang, Y., et al. "Evaluation of an Analog Accelerator for Linear Algebra", ACM/IEEE $43^{rd}$ Annual International Symposium on Computer Architecture (ISCA), Jun. 18-22, 2016, Seoul, South Korea, pp. 570-582.

Hasler, J., "Starting Framework for Analog Numerical Analysis for Energy-Efficient Computing", Journal of Low Power Electronic and Applications, 2017, vol. 7, No. 17, pp. 1-22.

Rose, C., et al., "Mathematical Statistics with Mathematica", New York: Springer, 2002, Chapter 11 (pp. 1-22) and Chapter 12 (pp. 2-26).

Kullback, S., et al., "On Information and Sufficiency", 1951, The Annals of Mathematical Statistics, vol. 22, No. 1, pp. 79-86.

Jaynes, E.T., "Information Theory and Statistical Mechanics", 1957, Physical Review, vol. 106, No. 4, pp. 620-630.

Spearman, W. et al. "Physics-Based Modeling of Pass Probabilities in Soccer". MIT Sloan Sports Analytics Conference 2017. http://www.sloansportsconference.com/ep-content/uploads/2017/02/1621.pdf.

* cited by examiner

Figure 1

| No. | Player | Age | Pos | Games G | Games GS | Rushing Att | Rushing Yds | Rushing TD | Rushing Lng | Rushing Y/A | Rushing Y/G | Rushing A/G | Receiving Tgt | Receiving Rec | Receiving Yds | Receiving Y/R | Receiving TD | Receiving Lng | Receiving R/G | Receiving Y/G | Receiving Ctch% | YScm | RRTD | Fmb |
|---|---|---|---|---|---|---|---|---|---|---|---|---|---|---|---|---|---|---|---|---|---|---|---|---|
| 23 | Devontae Booker | 23 | rb | 16 | 6 | 174 | 612 | 4 | 18 | 3.5 | 38.3 | 11 | 45 | 31 | 265 | 8.5 | 1 | 43 | 1.9 | 16.6 | 68.90% | 877 | 5 | 4 |
| 22 | C.J. Anderson | 25 | rb | 7 | 7 | 110 | 437 | 4 | 28 | 4 | 62.4 | 16 | 24 | 16 | 128 | 8 | 1 | 25 | 2.3 | 18.3 | 66.70% | 565 | 5 | 0 |
| 20 | Justin Forsett | 31 | rb | 4 | 3 | 43 | 155 | 1 | 64 | 3.6 | 38.8 | 11 | 10 | 7 | 34 | 4.9 | 0 | 11 | 1.8 | 8.5 | 70.00% | 189 | 1 | 2 |
| 35 | Kapri Bibbs | 23 |  | 12 | 0 | 29 | 129 | 0 | 24 | 4.4 | 10.8 | 2.4 | 4 | 2 | 75 | 38 | 1 | 69 | 0.2 | 6.3 | 50.00% | 204 | 1 | 0 |
| 13 | Trevor Siemian | 25 | QB | 14 | 14 | 28 | 57 | 0 | 14 | 2 | 4.1 | 2 |  |  |  |  |  |  |  |  |  | 57 | 0 | 4 |
| 12 | Paxton Lynch | 22 | qb | 3 | 2 | 11 | 25 | 0 | 10 | 2.3 | 8.3 | 3.7 |  |  |  |  |  |  |  |  |  | 25 | 0 | 2 |
| 40 | Juwan Thompson | 24 | fb | 8 | 1 | 8 | 26 | 1 | 14 | 3.3 | 3.3 | 1 | 1 | 0 | 0 |  | 0 | 0 | 0 | 0 | 0.00% | 26 | 1 | 0 |
| 32 | Andy Janovich | 23 | fb | 11 | 5 | 4 | 33 | 1 | 28 | 8.3 | 3 | 0.4 | 7 | 5 | 44 | 8.8 | 0 | 13 | 0.5 | 4 | 71.40% | 77 | 1 | 0 |
| 10 | Emmanuel Sanders* | 29 | WR | 16 | 16 | 1 | 4 | 0 | 4 | 4 | 0.3 | 0.1 | 137 | 79 | 1032 | 13 | 5 | 64 | 4.9 | 64.5 | 57.70% | 1036 | 5 | 1 |
| 11 | Jordan Norwood | 30 | wr | 14 | 6 | 1 | 0 | 0 | 0 | 0 | 0 | 0.1 | 35 | 21 | 232 | 11 | 1 | 36 | 1.5 | 16.6 | 60.00% | 232 | 1 | 5 |
| 8 | Brandon McManus | 25 | K | 16 | 0 | 1 | 6 | 0 | 6 | 6 | 0.4 | 0.1 |  |  |  |  |  |  |  |  |  | 6 | 0 | 0 |
| 88 | Demaryius Thomas* | 29 | WR | 16 | 16 | 0 | 0 | 0 | 0 |  | 0 | 0 | 144 | 90 | 1083 | 12 | 5 | 55 | 5.6 | 67.7 | 62.50% | 1083 | 5 | 2 |
| 85 | Virgil Green | 28 | TE | 12 | 11 | 0 | 0 | 0 | 0 |  | 0 | 0 | 37 | 22 | 237 | 11 | 1 | 31 | 1.8 | 19.8 | 59.50% | 237 | 1 | 0 |
| 83 | A.J. Derby | 25 | te | 6 | 3 | 0 | 0 | 0 | 0 |  | 0 | 0 | 20 | 16 | 160 | 10 | 0 | 17 | 2.7 | 26.7 | 80.00% | 160 | 0 | 1 |
| 87 | Jordan Taylor | 24 |  | 16 | 0 | 0 | 0 | 0 | 0 |  | 0 | 0 | 25 | 16 | 209 | 13 | 2 | 35 | 1 | 13.1 | 64.00% | 209 | 2 | 1 |
| 16 | Bennie Fowler | 25 |  | 13 | 0 | 0 | 0 | 0 | 0 |  | 0 | 0 | 24 | 11 | 145 | 13 | 2 | 76 | 0.8 | 11.2 | 45.80% | 145 | 2 | 0 |
| 82 | Jeff Heuerman | 24 | te | 12 | 2 | 0 | 0 | 0 | 0 |  | 0 | 0 | 17 | 9 | 141 | 16 | 0 | 31 | 0.8 | 11.8 | 52.90% | 141 | 0 | 0 |
| 14 | Cody Latimer | 24 | wr | 12 | 1 | 0 | 0 | 0 | 0 |  | 0 | 0 | 15 | 8 | 76 | 9.5 | 0 | 15 | 0.7 | 6.3 | 53.30% | 76 | 0 | 0 |
| 86 | John Phillips | 29 | te | 8 | 3 | 0 | 0 | 0 | 0 |  | 0 | 0 | 8 | 5 | 40 | 8 | 1 | 16 | 0.6 | 5 | 62.50% | 40 | 1 | 0 |
| 84 | Henry Krieger-Coble | 24 |  | 2 | 0 | 0 | 0 | 0 | 0 |  | 0 | 0 | 1 | 1 | 13 | 13 | 0 | 13 | 0.5 | 6.5 | 100.00% | 13 | 0 | 0 |
|  | Team Total |  |  | 16 |  | 410 | 1484 | 11 | 64 | 3.6 | 92.8 | 26 | 556 | 339 | 3914 | 12 | 20 | 76 | 21 | 245 |  | 5398 | 31 | 24 |
|  | Opp Total |  |  | 16 |  | 482 | 2085 | 15 |  | 4.3 | 130 | 30 | 306 | 202 | 2972 | 9.7 | 13 |  | 19 | 186 |  | 5057 | 28 | 23 |

Figure 2

| Statistical Record | | | |
|---|---|---|---|
| http://www.atpworldtour.com/en/players/roger-federer/f324/player-stats | | | |
| Roger Federer | | | |
| Career | | Career | |
| All Surfaces | | Grass | |
| SERVICE RECORD | | SERVICE RECORD | |
| Aces | 10,099 | Aces | 1,963 |
| Double Faults | 2,485 | Double Faults | 319 |
| 1st Serve | 62% | 1st Serve | 66% |
| 1st Serve Points Won | 77% | 1st Serve Points Won | 79% |
| 2nd Serve Points Won | 57% | 2nd Serve Points Won | 59% |
| Break Points Faced | 5,807 | Break Points Faced | 705 |
| Break Points Saved | 67% | Break Points Saved | 71% |
| Service Games Played | 16,720 | Service Games Played | 2,695 |
| Service Games Won | 89% | Service Games Won | 93% |
| Total Service Points Won | 69% | Total Service Points Won | 72% |
| RETURN RECORD | | RETURN RECORD | |
| 1st Serve Return Points Won | 33% | 1st Serve Return Points Won | 31% |
| 2nd Serve Return Points Won | 51% | 2nd Serve Return Points Won | 51% |
| Break Points Opportunities | 10,659 | Break Points Opportunities | 1,563 |
| Break Points Converted | 41% | Break Points Converted | 41% |
| Return Games Played | 16,337 | Return Games Played | 2,640 |
| Return Games Won | 27% | Return Games Won | 24% |
| Return Points Won | 40% | Return Points Won | 38% |
| Total Points Won | 54% | Total Points Won | 55% |

| | |
|---|---|
| Free Throw Made | 28 |
| Free Throw Missed | 14 |
| Field Goal Made | 62 |
| Field Goal Missed | 69 |
| Offensive Rebound | 15 |
| Defensive Rebound | 48 |
| Turnover | 27 |
| Foul | 30 |
| Dribble | 1620 |
| Pass | 393 |
| Possession | 565 |
| Blocked Shot | 9 |
| Assist | 40 |

Figure 7

HYBRID METHOD OF ASSESSING AND PREDICTING ATHLETIC PERFORMANCE

TECHNICAL FIELD

The present disclosure relates generally to evaluating and predicting athletic performance of individuals and teams.

BACKGROUND

Understanding and predicting athletic performance is important for setting athletes' compensation, optimizing training methods, developing rules for competition, wagering, developing tactics and strategies, and preventing injuries. Athletic competition combines the application of intentional, often precise, movements with uncertainties introduced by the environment and adversaries' actions.

Efforts to understand and predict the performance of athletes, both as individuals and as competitive teams, are grouped into two classes. In the first class, past athletic performance is evaluated using statistical moments of observed behaviors to estimate the future performance of a player or team. Batting averages in baseball, free throw percentages in basketball, first service percentages in tennis, and rushing yards in football are examples of statistical information that is used to evaluate and predict athletic performance. The underlying assumption of this class of method is that athletic activities are ergodic and stochastic.

This class of statistical methods is becoming more widely used as systematic measurements of athletic processes and events become more widespread. The ubiquity of high definition, high-speed video recording, wearable biological monitors, geospatial and local tracking systems for people and objects, and the like has produced huge sets of observational data from athletic events.

A second class of related art for evaluating and predicting athletic performance considers deterministic aspects of athletic activities such as the mechanics of cleats on turf, the ballistic trajectories of balls, the biomechanics of a thrower's body, collisional dynamics of contact sports, and the like. The influence of respiration, blood circulation, ligament strength, pharmacokinetics, and other physiological parameters are further examples of elements used in deterministic models of athletic performance. These methods presume that athletic performance is rigorously determined by initial conditions and mathematical equations that are not random.

A drawback of the first class of methods is that statistical attributes and predictions are based on associations rather than mechanistic, cause-and-effect relationships. A problem with assessments and predictions based solely on prior statistics is that they are ergodic. In other words, there is a presumption that the samples from which statistics are computed span the entire space of possible conditions. Yet another deficiency of the statistical method is that it is invalid for degrees of freedom that are not directly observed. These deficiencies limit the ability of the class of methods to interpolate and extrapolate from prior conditions. Another drawback of the first class of methods is that it fails to explicitly incorporate rules of the athletic event or competition.

A drawback of the second class of methods is that it does not account for underlying randomness in athletic performance. It is also often impractical to incorporate all relevant variables into a deterministic model. Yet another limitation of deterministic methods is that they can be chaotic. In other words, their nonlinearity can generate predictions that are too sensitive to initial conditions to be useful.

SUMMARY

The present disclosure provides hybrid systems and methods of evaluating the performance of athletes that systematically combine statistical inference with deterministic physical and biomechanical analytics.

An exemplary embodiment provides a system for assessing athletic performance including: obtaining a deterministic physical model of an athletic process; collecting observed, non-deterministic data from sensors deployed in corresponding athletic processes; hybridizing the deterministic physical model and the sensor data to yield a conditional probabilistic model; and optionally iteratively refining the model by minimizing a residue. Hybridization of deterministic and non-deterministic aspects may be performed by a microprocessor using one or more of analog computing, maximum entropy filtering, neural networks, nonlinear regression, simulated annealing, and maximum likelihood estimation. The system produces conditional probabilities that enable ranking of past performance and prediction of future performance that is subsequently displayed, added to databases, or communicated to athletes, coaches, and spectators.

Another embodiment provides a system for assessing athletic performance including: deriving statistical associations between aspects observed using sensors and outcomes of an athletic event; deriving a deterministic physical model linking the observed aspects of the athletic process to a variable that incorporates the statistical associations; hybridizing the deterministic physical model with the variable; and selecting a hybrid model that minimizes variance between predicted and observed outcomes.

A third embodiment provides an apparatus for applying graphical enhancements, the apparatus including: a hybridization processor configured to receive a deterministic physical model of an athletic process and a set of non-deterministic data from sensors deployed in corresponding actual athletic processes. The processor is configured to hybridize the deterministic physical model and the non-deterministic measurement data to yield a conditional probabilistic model and drive a display configured to apply a graphical enhancement to at least one image frame of a media stream based on predictions or evaluations of the conditional probabilistic model.

A fourth embodiment provides an apparatus for generating audio enhancements, the apparatus including: a hybridization processor that hybridizes deterministic and non-deterministic information of an athletic process to produce a conditional probabilistic model, and an audio enhancement processor configured to incorporate an audible addition or modulation to an audio stream based on predictions or evaluations calculated from the conditional probabilistic model.

Another embodiment provides an apparatus for producing sensory enhancements that may include visual, audible, haptic, or olfactory signals. The apparatus includes: a hybridization processor that generates a conditional probabilistic model from deterministic and non-deterministic data for an athletic process and a sensory enhancement processor configured to produce a sensible visual, audible, haptic, or olfactory signal based on the predictions of the conditional probabilistic model. These signals are configured to convey information from the conditional probabilistic model to athletes, coaches, and spectators during athletic competitions.

A sixth embodiment provides an apparatus that includes a processor that is pre-configured with a conditionally probabilistic model, one or more sensors configured to provide measured inputs to the processor, and performance evaluations output using visual, audible, or haptic signals.

It is to be understood that both the foregoing general description and the following detailed description are exemplary and explanatory only and are not restrictive of the disclosed subject matter, as will be set forth in the claims.

BRIEF DESCRIPTION OF THE DRAWINGS

Certain aspects will become apparent and more readily appreciated from the following description of non-limiting exemplary embodiments, taken in conjunction with the accompanying drawings in which:

FIG. 1 is a table of exemplary statistical data for a football team (Denver Broncos).

FIG. 2 is a table of exemplary statistical data for the tennis player Roger Federer.

FIG. 5 is a schematic diagram illustrating the constellation of sensors that convey non-deterministic data to a receiver.

FIG. 7 is a table of data from which statistical outcomes of a basketball game may be computed.

1. DEFINITION OF TERMS

Figure 3:
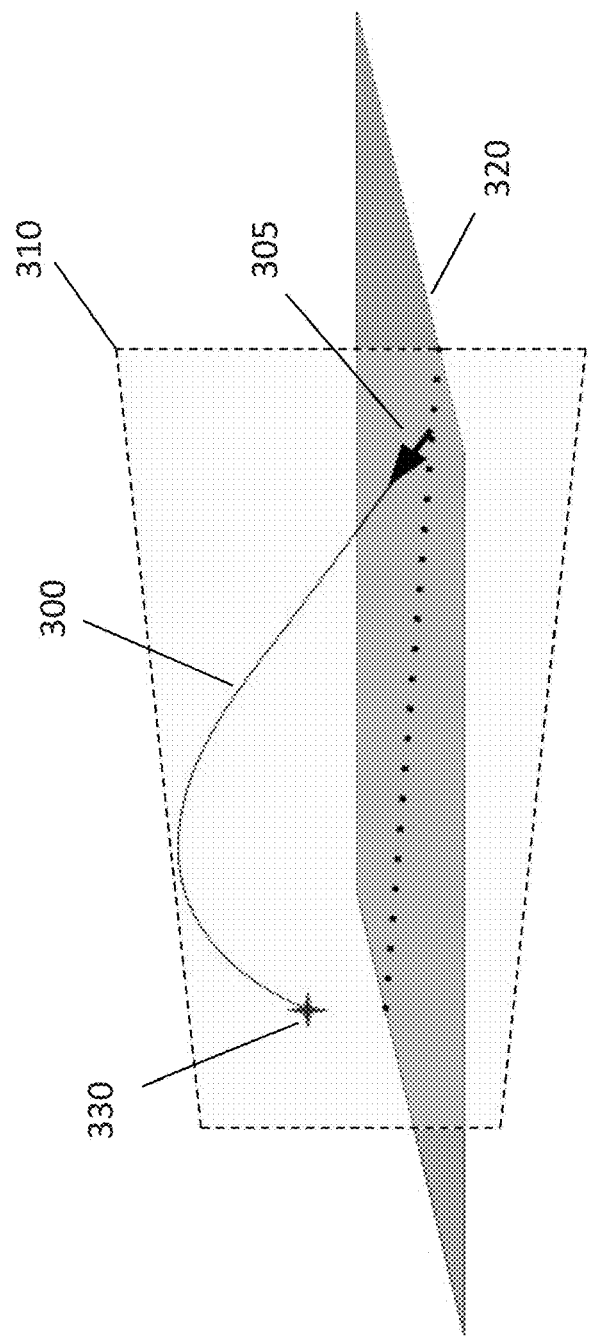
FIG. 3 is a diagram illustrating the ballistic trajectory of a point mass with a prescribed initial velocity vector.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of embodiments of the present disclosure. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an," and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . , and N, that is to say, any combination of one or more of the elements A, B, . . . , or N including any one element alone or in combination with one or more of the other elements which may also include, in combination, additional elements not listed.

The terms "first," "second," "third," and the like, as used herein, do not denote any order, quantity, or importance, but rather are used to distinguish one element from another.

The term "substantially," as used herein, represents the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

2. DESCRIPTION OF EMBODIMENTS

In one aspect of a system for assessing and predicting athletic performance, a deterministic model of an athletic process is created that links actions and outcomes using physical laws. The term "deterministic" may include a system in which randomness is not involved in the development of its future states. A physical model, may include a deterministic construction derived using principles primarily from physics, biology, physiology, or other natural sciences to approximate the behavior of one or more athletes executing specific skills. By contrast, "non-deterministic" may include a set of associations or correlations between the actions and outcomes that is stochastic, non-ergodic, or both. Stochastic phenomena have essential randomness, while ergodic phenomena have averages over time that equal those over accessible states of the system. The functional form and parameters of the deterministic model are varied and iteratively refined with the non-deterministic data acquired by sensors to produce a conditional probabilistic model (CPM) of performance that is consistent with known physics and observed data but noncommittal with respect to unobserved, random, or unphysical influences. The CPM construct accepts a combination of known and observed or measured values and outputs a probability distribution over some space of outcomes. This probability distribution is said to be conditioned on its inputs; for example, a different set of inputs could or would produce a different output distribution. A "hybrid model construction," may include a process whereby a CPM is produced by combining a mechanistic model with previously collected data. In other words, hybridization amalgamates determinism and probabilistic reasoning to create a method for making principled predictions, extrapolations, and interpolations of outcomes. Lastly, a "hybridization processor," as used herein, is one or more computing devices that hybridizes deterministic and non-deterministic inputs to produce the CPM.

In another aspect of a system for assessing and predicting athletic performance, a non-deterministic model is first constructed using an ensemble of sensor-based observations of a process. A set of hypothetical deterministic physical models are hybridized with the stochastic observations, yielding a set of CPMs that may be ranked based on the fidelity with which they describe existing observations and extrapolate or interpolate outcomes.

a. Deterministic Models of Athletic Processes

One example of a deterministic model for the motion of a ball employs Newton's equations adapted for ballistic trajectories. In some embodiments, a simple deterministic model may treat a ball as a point mass with no torques or drag forces. In other embodiments, a more complex deterministic model may characterize a football as an oblate spheroid with a deformable bladder with defined transient pressures, time-varying impact forces, rotation, nutation, forces from convective air motion, and the like.

A second example of a deterministic model may view the trajectories of players on a field or court using principals from collisional dynamics. Each participant delivers forces to change their momentum, develop kinetic energy from metabolic potential energy, and create an exclusion volume that defines when and if collisions with other players, balls, or targets occur.

A third example of a deterministic model may apply to, for example, cross-country track or skiing, where kinetic and gravitational potential energy are combined with metabolic energy and dissipative forces from friction and drag to constrain the trajectory of an athlete.

b. Statistical Inference Based on Observation of Athletic Processes

Some examples of non-deterministic approaches to measuring athletic performance are provided. Websites and other public records tabulate the observed performance of athletes at diverse granularities. FIG. 1, for example, shows a table of statistics for passing and rushing by the Denver Broncos in 2016, which are available from websites such as pro-football-reference.com. Data in the table are identified as follows: Age—Player's age on December 31st of that year. Pos—Position in player and team season stats (capitals indicate primary starter, lower-case means part-time starter). G—Games played. GS—Games started as an offensive or defensive player (numbers are complete for 1920-49, 1970-72 and 1975-present, but are incomplete otherwise). Rushing columns include: Att—Rushing Attempts (sacks not included in NFL). Yds—Rushing Yards Gained (sack yardage is not included by NFL). TD—Rushing Touchdowns. Lng—Longest Rushing Attempt. Y/A—Rushing Yards per Attempt (minimum 6.25 rushes per game scheduled to qualify as leader, minimum 750 rushes to qualify as career leader). Y/G—Rushing Yards per Game (minimum half a game per game scheduled to qualify as leader) (Rushing Yards)/(Games Played). A/G—Rushing Attempts per Game (minimum half a game per game scheduled to qualify as leader) (Rushing Attempts)/(Games Played). Receiving columns include: Tgt—Pass Targets (since 1992, derived from NFL play-by-play data). Rec—Receptions. Yds—Receiving Yards. Y/R—Receiving Yards per Reception (minimum 1.875 catches per game scheduled to qualify as leader, minimum 200 receptions to qualify as career leader). TD—Receiving Touchdowns. Lng—Longest Reception. R/G—Receptions per Game (minimum half a game per game scheduled to qualify as leader) (Receptions)/(Games Played). Y/G—Receiving Yards per Game (minimum half a game played per game scheduled to qualify as leader, 32 games for career leaders) (Receiving Yards)/(Games Played). Ctch %—Catch percentage, receptions divided by targets (since 1992). YScm—Yards from Scrimmage receiving and rushing yards. RRTD—Rushing and Receiving Touchdowns. Fmb—Number of times fumbled both lost and recovered by own team (these represent ALL fumbles by the player on offense, defense, and special teams).

FIG. 2 shows typical statistics for the tennis player Roger Federer that are available from, for example, the Association of Tennis Professionals (ATP). Records of field goal percentages, batting averages, putts per green, goalies' saves, runs batted in, and the like are some commonly used statistics. Statistical associations among physiological and performance parameters measured by sensors are also available, for example the relationship between heart rates and the rate of perceived exertion in competitive rowers is reported in Katherine Skrlj Krengel, Influence of Athlete Heart Rate, Rate of Perceived Exertion, and Anxiety in Rowing Practice and Competition (Thesis, Eastern Michigan University), March 2014, and is incorporated herein in its entirety by reference.

Another important class of non-deterministic data is available from sensors connected to athletes, their attire, athletic equipment such as balls or pucks, video and audio recordings, and other devices such as anemometers, barometers, and thermometers that measure the athletic environment.

Ranking of players and teams using statistical moments of past performance is used among trainers, sports agents, commentators, player scouts, team owners, gamblers, team physicians, and participants in fantasy leagues. Changes to statistical moments such as averages and variances over time are also used by individual athletes to identify trends in performance and to correlate training methods with its improvement.

c. Hybridization Methods

One example of a hybridization method is constrained maximum entropy filtering (CMEF). A putative CPM, $P_0(\bar{x}|\alpha)$, can be used to predict, via sampling, the outcomes that should have been observed if the CPM were the "right" one. The residual—the difference between what was observed and what the CPM predicted—can be used correct the CPM. In other words, hybridization uses residues to transform $P_0(\bar{x}|\alpha)$ to $P_1(\bar{x}|\alpha)$, an improved version of the CPM. Hybridization can be iterated, and may be subject to one or more stopping criteria. This transformation may be a complex, nonlinear mapping of attributes of the probability densities predicted by the deterministic model and those of the observed statistical data that is described as a function of the CPM's hyperparameters. Hyperparameters are parameters of a prior probability distribution, and the prefix hyper is used to distinguish them from parameters of the underlying system being analyzed.

A second method of hybridization combines deterministic outcomes with observed outcomes in a neural network. The number and topology of layers, the number of neurons per layer, the number of training iterations, the synaptic weights, and other network parameters may be adjusted to minimize the difference between calculated and observed outcomes. These methods are described, for example, in Bashir and Geranmayeh, Scientia Iranica, volume 18, issue 6, pages 1600-08 (2011), and Ding et al., Evolutionary artificial neural networks: A review, Artificial Intelligence Review (Springer, 2013), which are incorporated herein in their entirety by reference.

A third method of hybridization combines deterministic and observed outcomes in an analog computer. Analog computing methods are well suited to the solution of differential equations, particularly those that are nonlinear. Many physical models of athletic processes are based on these types of equations. Methods of analog computing are set forth, for example, in N. Guo et al., Energy-Efficient Hybrid Analog/Digital Approximate Computation in Continuous Time, IEEE Journal of Solid-State Circuits (Volume: 51, Issue: 7, July 2016); Huang et al., Evaluation of an Analog Accelerator for Linear Algebra by (2016 ACM/IEEE 43rd Annual International Symposium on Computer Architecture (ISCA), 18-22 Jun. 2016, Seoul, South Korea); and J. Hasler, Starting Framework for Analog Numerical Analysis for Energy-Efficient Computing. Journal of Low Power Electronics and Applications 2017, volume 7, issue 3, page 17ff, all of which are incorporated herein by reference in their entirety.

A fourth method of hybridization combines deterministic and statistical elements in a nonlinear regression. Nonlinear functions that characterize physical models include exponential, logarithmic, trigonometric, power, and Gaussian functions, and the like. In an embodiment, a method for establishing the parameters of nonlinear regressions is the Maximum Likelihood Estimation described, for example, in Chapters 11 and 12 of Mathematical Statistics with Mathematica by Colin Rose and Murray D. Smith (New York: Springer) 2002 with electronic editions in 2010, 2011, and 2013, herein incorporated by reference in its entirety.

Application of these and other hybridization methods that combine and optimize deterministic and stochastic models may be applied to generate CPMs consistent with aspects of the present disclosure.

These and other aspects of the present disclosure will become more apparent by describing in detail illustrative, non-limiting embodiments thereof, referring to the accompanying drawings, in which like reference numerals refer to like elements in the drawings. The drawings illustrate, not by way of limitation, to further the understanding of exemplary embodiments. These embodiments are described in sufficient detail to enable those skilled in the art to practice the inventive concepts disclosed herein and it is to be understood that other implementations may be utilized and that structural changes and/or substitutions of various elements may be made without departing from the scope and spirit of inventive concepts. The following detailed description of exemplary embodiments is, therefore, not to be construed in a limiting sense. For example, some exemplary embodiments are described herein refer to a football field goal and a basketball game. However, aspects of the present disclosure may apply to other sporting events or athletic activities.

Additionally, the various exemplary embodiments as described may be implemented in the form of software running on a computer, in the form of a specialized hardware, or a combination of software and hardware. These computers and software may process data and models according to the disclosure both after the athletic process is complete or in nearly real-time as the athletic process or event is unfolding.

3. EXAMPLES

In this disclosure, an initial deterministic physical model of an athletic process is constructed from known deterministic laws of natural sciences. Measurements of various aspects of the process are next obtained from sensors of disparate modalities. An amalgamated, hybrid model is produced. Hybridization is preferably iterative, using neural networks, maximum entropy filtering, nonlinear regression, maximum likelihood estimation, or other similar methods. The result is a CPM that predicts and describes performance with far greater accuracy than that of unhybridized models, whether these be deterministic or non-deterministic.

The role of the sensor data is not to produce summary statistics such as are normally associated with sporting events. These statistics, such as batting averages, pass completion percentages, putts per green, and the like are associated with the outcome of an athletic process. These data may be used either as an input to the hybrid model or as a supplement to it. The hybridization procedure is focused on the production of a more accurate model of the process in question. Although summarizing statistics may be one aspect of generating the CPM, various additional components of the process, which include athletes, inanimate objects, and the athletic environment, are instrumented with sensors to specifically obtain data that are used with and may enhance the hybrid model. Sensors, sensor combinations, and the data obtained therefrom, are selected, to produce the highest possible fidelity to observed athletic outcomes. For example, a non-deterministic model of striking a baseball might use the batter's prior hitting average to estimate the probability of a successful hit. A CPM produces higher fidelity by incorporating the mechanical properties of the bat and ball, the biomechanics of the ligaments, tendons, muscles, joints, and bones of the player, and the variability of the velocity vector and spin of the incoming pitch along with prior non-deterministic data from measurements of the batter's and pitcher's performance to estimate the probability of a successful hit. As a result, the CPM is far more accurate with respect to the predicting the success of hitting a baseball, than just using the prior hitting averages.

Hybrid methods achieve their superior performance by creating a more accurate model of the athletic process than is possible by either purely deterministic or purely stochastic methods. The reason is straightforward: while all macroscopic processes can be described by Newtonian physics, there are limits to their effectiveness that arise from two separate yet related factors: first, the equations which describe the phenomenon, especially when describing the interaction between multiple components, may soon become far too complicated to solve explicitly. Secondly, there almost always exist exogenous factors (e.g., environmental factors) that vary almost continuously, and hence any attempt to capture their precise effect in a particular instant may have limited bearing on what happens in the next instant of time. Using only determinism amounts to the hypothesis that these effects are cumulatively small and can be ignored, while using only statistical methodology is predicated on the belief that the entire system is random and that understanding emerges only through repeated observation without concern for the mechanism. Hybridization "splits the difference" by creating principled models that start as deterministic ones and using data in a specialized manner to modify the deterministic model so that is incorporates the variability of the process that was not an explicit part of the initial input. The result of hybridization is the CPM, known mathematically as a stochastic process.

As an example, consider a batter hitting a baseball. One summary statistic that is easily computed is the percentage of time the batter swings and puts the ball in play. One obviously does not need to know anything about the mechanics of batting to calculate this quantity. Now, suppose there was a need to create a CPM that modeled this process so that one could predict accurately whether a particular swing would result in a fair ball. One could begin by creating a physical or deterministic model that used the plane of the swing, its speed and acceleration, along with the mass and shape of the bat and velocity of the ball to predict the angle at which the ball will leave the bat after being struck. While such a model may appear complete, it contains many assumptions, among these being that the plane of the swing is constant, the bat is homogeneous and has no vibrational modes, the batter's grip on the bat is perfect, etc. Not only are these considerations not part of the model, but they clearly vary not only by batter, but by bat, and also possibly from swing to swing, or even within a swing. Consequently, in order to create a model that incorporates these (and perhaps other, unthought-of) features, supplementary data can be collected for example by placing a sensor on the batter's wrists to measure position and acceleration and combine this data with telemetric data extracted from high-speed video. Hybridization of the deterministic model with the data collected from the sensor configuration described produces a CPM with a much more accurate probabilistic forecast of success (i.e., putting ball in play) on any given swing. Such a model can be used for example not only for instructing batters (e.g., you can achieve a desired result with higher probability by adjusting your swing plane accordingly), but also for use in a strategic or even tactical fashion by opposing pitchers.

CPMs may be incorporated into wearable devices to generate improved performance predictions that may be communicated promptly to the athlete, her teammates, trainer, coach, commentators, and spectators. In the previous example, one could imagine a team's manager obtaining real-time (i.e, swing-by-swing) information concerning the swing plane of a batter from sensors located on the athlete and a CPM generated by the hybridized process above to predict the likelihood of success. Such information may be used in a variety of ways by being communicated to the batter. For example, corrective measures may be employed by the batter to improve the batter's swing. Another CPM may predict (probabilistically) where in play the ball will be hit given the parameters of the swing, enabling the implementation of tactical moves such as for example a hit-and-run.

To summarize: CPMs generate probability distributions over a space in which all possible states of a system are represented, in other words a phase space, of outcomes. They can be used to calculate probabilistic estimates of future events as well as accurately characterize past performance. CPMs are the output of the hybridization process that combines an initial deterministic model and selected data to produce an enriched model that is a more accurate, and consequently more useful, description of an athletic process that encapsulates both its physics and its intrinsic variability.

CPMs are the output of the hybridization process that is a faithful and principled description of an athletic process that encapsulates both its physics and its intrinsic variability. While all of the examples of CPMs disclosed herein are produced by hybridization of deterministic and non-deterministic data elements, it is possible to produce a CPM by other means.

Another example of how CPMs may be used is incorporated into a wearable device so that performance predictions can be generated and communicated promptly to the athlete, her teammates, trainer, coach, commentators, and spectators. For example, a wrist band with an accelerometer and transceiver can measure an athlete's force and kinetic energy as described below. Those values may be used with a processor configured with a CPM (generated by the process described previously) either on the wrist band or wirelessly to a server. The wristband may relay haptic or audible signals to indicate whether their swing plane, pace of play, etc. should be adjusted accordingly. The CPM may, for example, incorporate the fundamental physical constraints of biological energy conservation and power generation with statistical data on the patterns of these quantities in successful competitions.

An exemplary, non-limiting embodiment of a system according to the present disclosure is described in the following sequence of procedures. A hybridization processor may be programmed to hybridize an initial deterministic model with specialized sensor data to produce a CPM. Hybridization may be iterative, and the CPM may evolve as new sensor data are acquired or new physical principles are recognized and incorporated. The resulting CPM, which is an encapsulation of the athletic process, enables video, audio, and sensory enhancements based on results generated from the CPM. For example, the hybridization processor may overlay a graphical statistic computed with the CPM on a televised football game. It may be provided as a part of the video broadcasting system or as a stand-alone device connected to a display to provide enhancements to a broadcast. In some enhancements that require significant processing power and speed, a preferred embodiment includes a stand-alone device that processes the live or video stream and adds the enhancements thereon. Alternatively, on-the-fly calculations may employ distributed parallel or cloud computing infrastructures with data and results transported to the cloud or parallel processors using wireless or wired networks.

Alternatively, a set of associations among stochastic observable aspects of an athletic event may be established using statistical inference. CPMs generate probability distributions over a phase space of outcomes. A series of physical models may be hybridized with the associations and iteratively refined to enable interpolation between and extrapolation from the statistical inferences. Methods of hybridizing deterministic and non-deterministic aspects of athletic processes disclosed herein can be accomplished with either class as the starting point for generation of a conditionally probabilistic model.

Merging the deterministic and stochastic information through hybridization provides a more accurate assessment of athletic performance than a deterministic physical model or a model based on statistical data, taken individually. The reasons for this are as follows. Statistical methods presume ergodicity; in other words, the measurements on which statistical inferences are based must span the full state space of the system. This makes accurate extrapolations and interpolations impractical since they typically require many measurements to provide useful statistical confidence. On the other hand, deterministic methods can make accurate interpolations and extrapolations with confidence, but they fail to incorporate the underlying stochastic character of athletic processes. Moreover, deterministic models are challenged to completely characterize the initial conditions of complex athletic processes, which contributes essential noise into these equation-based models. Whereas CPM, produced by hybridizing both models, synthesizes a description that provides interpolation and extrapolation with confidence using sparse measurements by balancing the contributions of stochastic and deterministic constraints. Thus, an exemplary embodiment can provide a graphical enhancement displaying more accurate player performance predictions or descriptions. Accordingly, exemplary embodiments are directed to a new device that implements an algorithm for providing video enhancements from CPMs.

An exemplary process for which a hybridized conditionally probabilistic model may be sought is kicking a field goal in North American football. This process is characterized by a deterministic model, which takes an input variable as an independent variable and outputs an output value as a dependent variable. For example, a simple deterministic model represents the ball as a point mass, and characterizes a result of the kicking motion by a single vector quantity, the football's velocity, $\vec{v}$, as it leaves the kicker's foot.

Referring to FIG. 3 and assuming the ball is not kicked along the ground—in other words if the angle of $\vec{v}$ subtended by the field surface is greater than zero—there is a unique plane (310) containing the velocity vector (305) that is normal to the playing field (320). The ball must traverse this plane over its entire path (300) through the air and cross the end-zone at a height (330).

Neglecting air resistance, the ball would follow a parabolic trajectory and travel a horizontal distance (in yards) of:

$$x = \frac{\|\vec{v}\|^2 \sin 2\theta}{3g} \quad (1)$$

where $\|\vec{v}\|$ is the speed in feet per second, $\theta$ is the angle that the velocity vector makes with the ground plane, and g is the acceleration of gravity.

Letting d be the distance (in yards) to the plane of the end zone that contains the goalposts (hereinafter, the "end plane"), the ball will cross the end plane at a height (h in feet) given by:

$$h = 3d \tan \theta - 18 d^2 (g/\|\vec{v}\|^2) \sec^2(\theta) \quad (2)$$

Thus, equation 2 is a function that has a first variable, $\vec{v}$, as an independent variable and a second variable, h, as a dependent variable.

Figure 4:
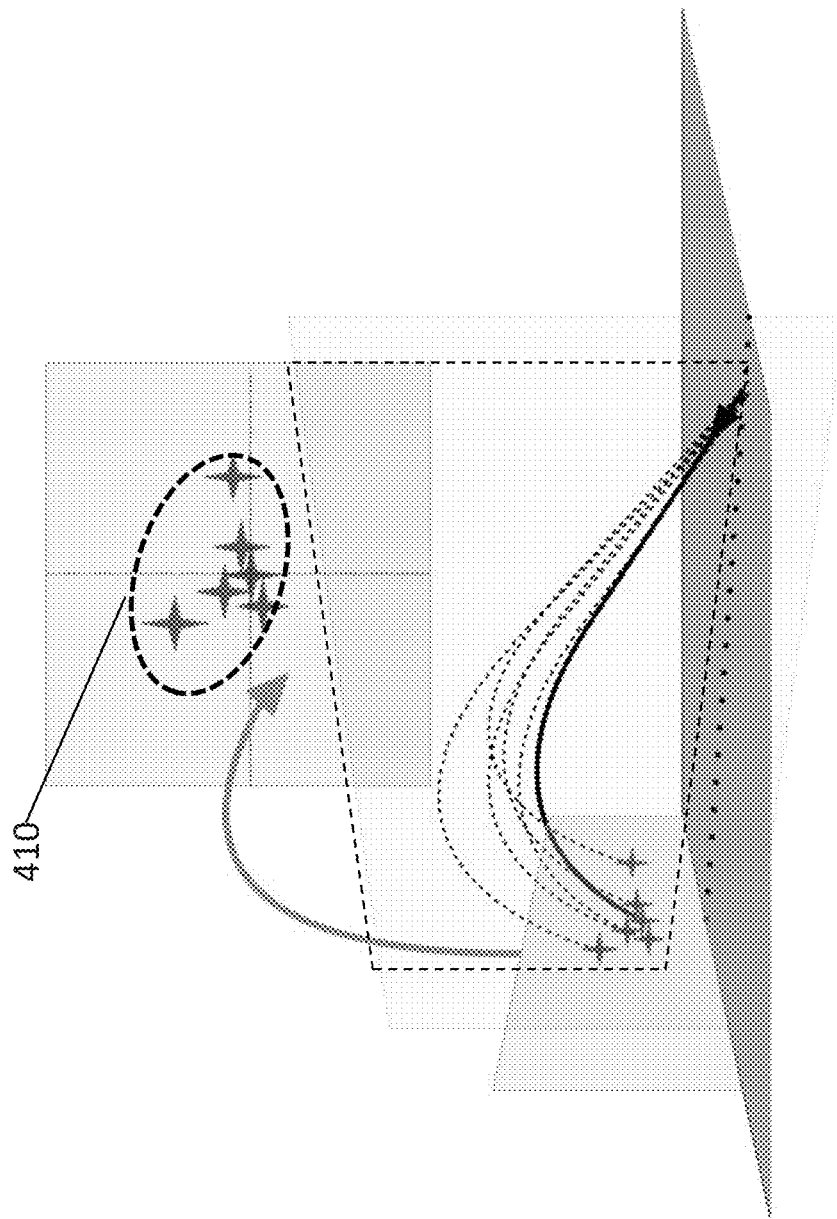
FIG. 4 is a diagram illustrating non-deterministic measurements of the locations at which a football traverses the goal post.

The deterministic model can be hybridized to produce a CPM that is improved by incorporation of stochastic observations. Using an input parameter, e.g., the velocity vector, the hybridization algorithm (HA) may construct a function whose inputs are velocity vectors, and whose output is a two-dimensional distribution of positions at which the football will cross the end plane. An example of such a distribution (410) is illustrated in FIG. 4.

This HA accepts the deterministic model, together with measured or observed data of one or more modalities as inputs, and generates a CPM. The field goal example produces a conditional probability distribution $P(x, y|\vec{v})$. Hence the output of the HA is a family of distributions, indexed (or parameterized) by the velocity vector. Any single distribution within a family of distributions (i.e., the result of specifying a velocity vector), can be displayed in any number of ways for purposes of athletic assessment and/or prediction. For example, a scatterplot can be output that displays all possible positions at which the football is predicted to cross the end plane within a specified confidence interval. As an example, data points can be shown for all positions where it is predicted with at least 95% confidence that the football will cross the end plane. In some embodiments, a continuous probability distribution is shown. Additionally, estimates of a continuous probability distribution, such as by a histogram, or by other forms of discrete probability distributions, can be used. Moreover, a heat map can be displayed which shows a gradation of coloring where the areas of like probability are indexed by colors or contours.

The hybridized function is not a pure statistical model because the way it produces the family of distributions is not entirely data driven. Statistical models, as used herein, are non-deterministic constructions derived from repeated measurements of observable properties of a person, system, process, or event. In fact, it may be difficult for a statistical model to produce even a relatively small family of distributions because there may not be enough data with a large enough variety of input velocity vectors to enable convergence to a parameterized family with useful confidence. One may need hundreds of field goal attempts, each at a given (fixed) velocity vector, to approximate the entire family.

Since the HA has an underlying deterministic model at its disposal, it can effectively interpolate across missing inputs. Unlike a purely statistical model, it uses the quantitative relationships that exist between (in this case) the velocity vector and the expected vertical displacement to interpolate or extrapolate what distributions are most likely given velocity vectors for which there are no observations. A non-deterministic model alone based on finite data, tautologically, cannot do this.

An HA achieves model interpolation and extrapolation by operating under an assumption that nearby inputs generate distributions that are correspondingly close. This assumption is a qualitative statement that must be made precise (and hence quantitative) to become useful. In some embodiments, because the parameter space may be the space of velocity vectors, it follows that distance between any two data points may be approximated by taking the average, such as the (Euclidean) norm, of the difference. The space of probability distributions may be convex, but is not a vector space and hence may possess no norm. However, the space of probability distributions may be endowed with any of several metrics. For example a version of the Kullback-Leibler (KL) divergence, also called relative entropy, is a measure of how one probability distribution diverges from a second expected probability distribution as set forth in Kullback, S.; Leibler, R. A. (1951). "*On information and sufficiency*". Annals of Mathematical Statistics. 22 (1): 79-86, which is incorporated by reference herein.

In some embodiments, realizing an HA comprises choosing a metric, combined with a method for relating distance between inputs to that of the potential output distributions.

There are many potential techniques for hybridization, and thus many possible methods by which hybrid CPMs are generated. Nonlinear regression, analog computation, maximum likelihood estimation, and the like are non-limiting examples of techniques for hybridizing stochastic and deterministic methods according to the present disclosure. Constrained maximum entropy filtering (CMEF) illustrates an instantiation of a Hybrid Algorithm: a deterministic model of the flight of a kicked football, i.e., one which associates a unique path through space to every initial velocity vector, can be thought of as a degenerate probability distribution on the set of such paths. In other words, it is a constant distribution: if one adopts the frequentist view of probability, such a distribution produces the same output no matter how often it is sampled. Constant distributions have minimum relative entropy, viz., 0, since these possess no randomness at all.

At the other end of the spectrum is a "completely random" process—one in which any trajectory curve is as likely as any other, regardless of the initial velocity. Such a distribution would have "maximum entropy," but would fail to respect the underlying physics. In CMEF, an iterative procedure is used whereby a given distribution may be modified subject to constraints: (i) sampling from it must produce data that agree with observations, while (ii) the entropy of the new distribution must be greater than that of the original.

Such a CMEF can be realized by using functional approximation methods for representing the parametrized distributions (employing hyperparameters), and adjusting these hyperparameters to achieve the desired balance between explanatory capability and stochastic flexibility. Characteristics of the HA include a choice of metric and specification of a policy for deciding when further iterations are no longer needed, in other words a stopping criterion.

Figure 5:
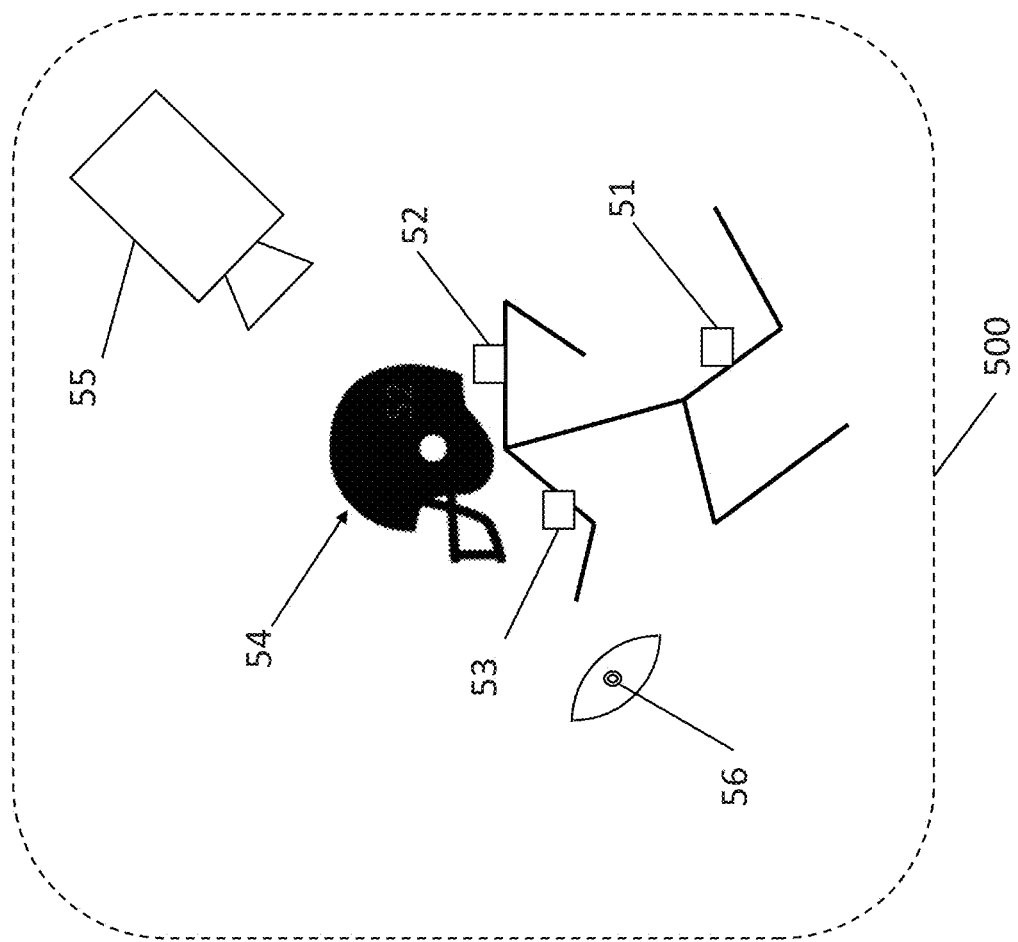
FIG. 5 is a schematic diagram illustrating an exemplary hybridized function, consistent with embodiments of the present disclosure.

FIG. 5 illustrates a component of an exemplary system for analyzing and/or predicting athletic performance according to aspects of the present disclosure. One or more sensors (51-56) that measure the athlete, equipment, or athletic environment are provided. Sensors comprise devices that characterize physical attributes (e.g. acceleration, impulse, velocity, illumination, acoustic pressure), physiological attributes (e.g. heart rate, blood oxygenation, respiratory rate, skin electrical conductivity), or environmental attributes (e.g. temperature, humidity, wind velocity vector, barometric pressure). Referring to FIG. 5, sensors 51, 52, and 53 are attached to an athlete's body and gather data individually or in combination. Sensor 54 is attached to sporting equipment such as a helmet, sensor 55 is a video camera, and sensor 56 is embedded in the game ball. Sensors 51 through 56 may be further configured to transmit information to a receiver. A receiver is a device configured to receive wired and/or wireless measurements from external devices.

Figure 6:
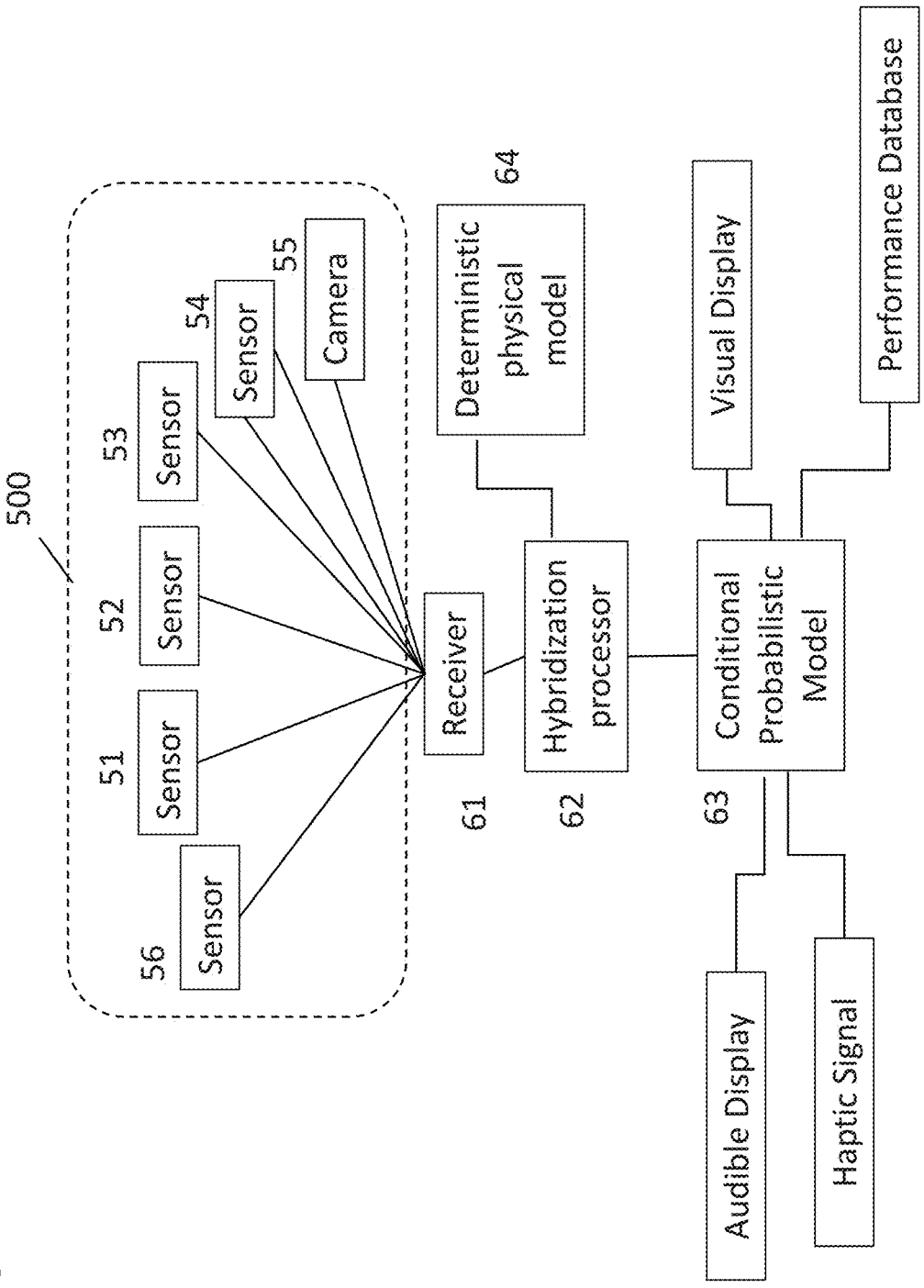
FIG. 6 is a block diagram illustrating the system according to the present disclosure.

An exemplary system for predicting athletic performance is shown in FIG. 6. This system comprises a receiver (61) that collects stochastic observational data from one or more sensors during an athletic performance; a deterministic model of the performance, and a hybridization processor (62) that generates a CPM (63) from the deterministic model and non-deterministic data. The CPM produces one or more predictions or descriptions of athletic performance that may be displayed or conveyed by audible, visual, haptic, or other means to spectators, viewers, athletes, or coaches.

The hybridization processor (62) may be configured as a standalone microprocessor, a distributed processor on a local network, or a cloud processing platform that relays data and results over a wide-area or global network.

As shown in FIG. 6, a hybridization processor may take as inputs a deterministic model (64) (given by, for example, motion equations, such as equations 1 and 2), together with measured or observed data, and generate a hybridized function. Examples of observed data in the case of a field goal kick may include measured points where a ball is observed to pass the end plane. Observed data may also include direct measurements of velocity of a field goal kick by a player using video recordings or a wireless accelerometer embedded in the ball. Observed data may further include calculated values which are based on, for example, observed locations where the ball passes the end plane and wherein the initial velocity is solved for based on the kicking location. Observed data may also include commonly recorded statistics such as total field goals made and total field goals attempted.

A hybridized function may be a function accepting an input, such as a velocity vector, and generating an output, such as a probability distribution. As in the case of the field goal example, a hybridized function may produce a conditional probability distribution, for example, $P(x, y | \vec{v})$.

In some embodiments of the disclosure, the hybridized function is configured to accept a variable input vector or tensor with components expressed in different units or dimensions.

Hybridizing a function may be iterative. A residual, in other words a function of the difference between predictions of the CPM and observations of the corresponding athletic processes, is computed and used to correct a CPM. This function may be complex or nonlinear, and its form varies in detail with the specific aspects of the process being modeled by the CPM. The residual function varies systematically with hyperparameters that characterize the CPM, so iteration of the hyperparameters to map the residual function onto a target shape or magnitude may improve the fidelity and predictive power of the CPM. Illustrating this approach for the previous example, a CPM might describe the probability density of a field goal kick's location in the end-zone plane by a two-dimensional Gaussian function with parameters indicating the means ($\mu x$, $\mu y$) and variances ($\sigma_x^2$, $\sigma_y^2$) in the horizontal and vertical directions and $\theta$, characterizing the rotation of the probability density in the vertical plane. Hyperparameters {a, b, c, and d} characterize the form of the ball trajectory based on classical mechanics. These hyperparameters may be iteratively refined to minimize the difference between the parameters estimated by the CPM and those that are observed. In other words, the hyperparameters {a, b, c, and d} are iteratively adjusted to reduce the difference between observed and predicted values of ($\mu_x$, $\mu_y$, $\sigma_x^2$, $\sigma_y^2$, and $\theta$). A variety of residual functions may characterize this difference, including simple norms, weighted combinations of variances, means, and angles, or any function that maps CPM outputs onto observed data.

Some embodiments of the disclosure may include hybridizing a function based on mechanical models and observed data. The present disclosure is not limited to mechanical models and may comprise any model that is deterministic. Also, while some examples are given in which the observed data include prior statistics, the present disclosure is not limited thereto and may comprise any model that is stochastic.

In some embodiments, the observed data may be classifiable into groups. For example, observed data for a field goal kick may be indexed by team, by player, by field location, by year, etc. A particular CPM may therefore be based on data associated with a particular team, player, player position, field location, season, etc.

Other embodiments hybridize superficially unrelated athletic processes. For example, deterministic and stochastic models of the trajectories of direct kicks in European soccer may be hybridized with models of field goal attempts in American football and kicking in rugby.

Another embodiment of a system according to the present disclosure increases the complexity and level of detail in the physical model. Refining the initial deterministic model representing the football as a point mass and a single condition of a velocity vector, this physical model may include one or more of these deterministic aspects:

the football is an oblate elastic spheroid with variable, transient internal pressure distributions;
the kicker imparts momentum to the ball via an impulsive interaction, enabling spin, nutation, and precession;
there is gas dynamic drag as the ball moves through static air; and
wind influences the ball's trajectory.

In contrast to the simple model there may be no closed form algebraic expression for the trajectory of the football in this physical model. Rather the trajectory, which is no longer constrained to a single plane, is determined by integration of coupled differential equations. A totality of input parameters (ball inflation pressure, impulse vector, atmospheric pressure and humidity, etc.) can be collected and combined into a single combined quantity, which is denoted by a vector $\vec{\alpha}$. Weights, which may act as hyperparameters, are assigned to individual input parameters, either preset or predetermined to vary with the importance of the variables to generate the vector $\vec{\alpha}$. As before, the physical model produces an explicit functional relationship between $\vec{\alpha}$ and the vertical and horizontal displacements that determine whether the kick scores.

The same procedure described above can be used to hybridize the desired CPM. However, the hybridization now acts on diverse families of distributions, where previously the family of trajectories was parameterized by a single velocity vector, now it may be indexed by the multicomponent vector $\vec{\alpha}$, that includes pressures, impulse dynamics, moments of inertia, and the like. Consequently, hybridization produces a family of probability distributions or CPMs of the form $P(x, y | \vec{\alpha})$, characterizing the probability that the ball will cross the end plane through a designated region for any set of initial parameters $\vec{\alpha}$.

Another embodiment of the method further embellishes the physical model by incorporating quantities like the angle at which the ball is held when kicked, the time between the snap and the kick, the position of the kickers planted foot relative to where the ball is placed, and biometric data such as the kicker's heart rate and blood pressure. Such biological data may significantly influence the trajectory, as is observed in Olympic pistol, rifle, and archery, where competitors train to trigger shots between heart beats. Although the resulting mechanistic model can be made more complex, it remains deterministic: for each set of input parameters $\vec{\beta}$ a single vertical displacement is computed, which is associated with a horizontal displacement. This relationship is functional, in the mathematical sense, so the HA may operate with necessary changes as before. Given a physical model and relevant measurements, it will produce $P(x, y | \vec{\beta})$.

As the dimension of the parameter space, the $\vec{\beta}$s, increases, the available data become more sparsely attributable to any fixed parameter. Without hybridization and the information engendered in the physical model, the data-driven statistical modeling techniques loses power because the number of relevant observed data that can be associated to each outcome necessarily decreases.

An implementation of the HA to evaluating athletic performance can combine video recordings with accelerometer data collected from a ball and the ankle of each prospective kicker to rank the performance of a series of competitors for a starting lineup. Another implementation of the same HA can also be deployed with video records alone in a coaching environment to improve the probability that a field goal will be successful from diverse positions on the field. A third implementation of the field goal kick HA can incorporate images from video recordings to aid commentary during a game by measuring the angle and velocity of the kick in real time and posting the probability of success on a display before the ball traverses the goal posts.

The preceding embodiments applied to field goal kicking illustrate the method of the present disclosure, but any athletic action or series of actions is amenable to this technique. First, construct one or more deterministic models, possibly at varying levels of fidelity to the physical phenomena under consideration. Next, acquire data from sensors of the athlete, athletic process, and athletic environment. Finally, hybridize the physical model with sensor data using maximum entropy filtering, nonlinear regression, analog computation, maximum likelihood estimation, neural networks, or the like with the available data to generate a family of conditional probability distributions that can be used to assess past and future performance.

A CPM can be used to generate an athletic statistic, such as a probability of whether a field goal kick will succeed, with accuracy contributed by both deterministic and non-deterministic factors. The calculated statistic can be overlaid on a screen broadcasting a video stream of a competition. A CPM may be used to generate a simple scoring probability, or the complete probable trajectory of a ball during a field goal kick that can be overlaid on a screen as a graphical enhancement.

A video enhancement apparatus may display visual enhancements based on data output from a CPM to enhance the view of a sporting event. Digital or analog moving or still images of a sporting event may be displayed on a monitor, television, smart phone, or other visual display. In an exemplary embodiment, a video enhancement device may modify the live stream or video content of an athletic event based on user instructions or predetermined settings and continuously output the modified stream to a consumer device such as a television, a personal computer (PC), a tablet computer, or a mobile telephone.

A processor of the video enhancement apparatus may be programmed to construct one or more deterministic models which may represent a physical phenomenon of a sporting event, such as a field goal kick. The hybridization processor may use maximum entropy filtering, nonlinear regression, analog computation, maximum likelihood estimation, neural networks, or the like with deterministic models and statistical data to generate a family of probability distributions that can be used to assess past and future performance. In some embodiments, the processor may begin with a statistical data set and may add virtual values to the data set by extrapolating and interpolating values based on one or more deterministic models. Thereafter, a hybridized model may be constructed. The hybridized CPM can be used to generate statistics used for graphical display.

Some embodiments provide calculated statistics for purposes other than enhancement of a display. For example, calculated statistics based on the hybridized CPM may be used in assembling a database of player data, formulating a training plan, calculating a player's compensation based on expected performance, comparing the performance of individual players who are competing for a position on a team, assessing players' health and probability of future injury, etc.

Another embodiment of a system according to the present disclosure applies to team sports such as basketball. FIG. 7 is a table of outcomes from a game between the Milwaukee Bucks and the Detroit Pistons on Jan. 22, 2014. Statistics such as the successful free-throw percentage (67%), successful field goal percentage (47%), foul rate (one per 90 seconds), and the like can be computed from these records for this pair of adversaries. Extending this type of observation to many competitions enables comparisons of players and teams such as are found at websites such as nba.com. An implicit assumption in such non-deterministic comparisons is that all players and teams would be equal without the intangible factors that generate competitive advantage and that these factors are reflected in the measured statistical differences among their performances. In other words, the measurements are presumed to reflect an ergodic process that has the same behavior averaged over time as averaged over the space of all of the system's states in its phase space.

Figure 8:
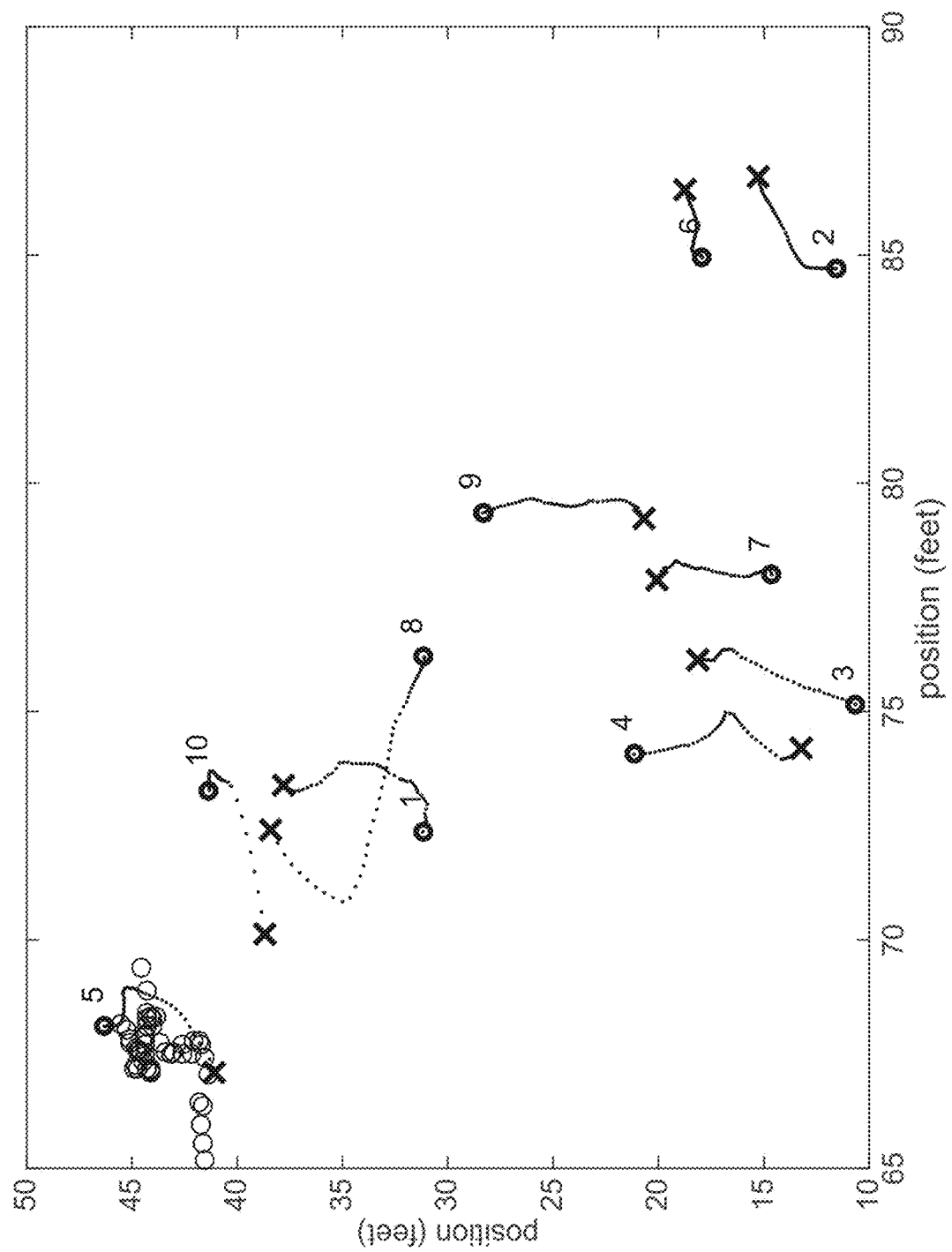
FIG. 8 is a plot showing the trajectories of ten basketball players (.) and the ball (O) recorded every 40 milliseconds for the first two seconds of play starting at the numbered bold circles and ending at the bold x's.

In some embodiments, according to the present disclosure, a method generates a physical model of a basketball game starting with ten players and a ball moving randomly on a 94×50 foot basketball court surface. The positions for each of the ten positions and the ball are recorded every 40 milliseconds for the duration of the game. A snapshot of the players' and ball's trajectories in the plane of the court for the first 2 seconds of play is shown in FIG. 8. A first deterministic physical model for this embodiment is comprised of interacting energetic particles. The positions are differentiated with respect to time to compute the velocity and acceleration of each player.

Figure 9:
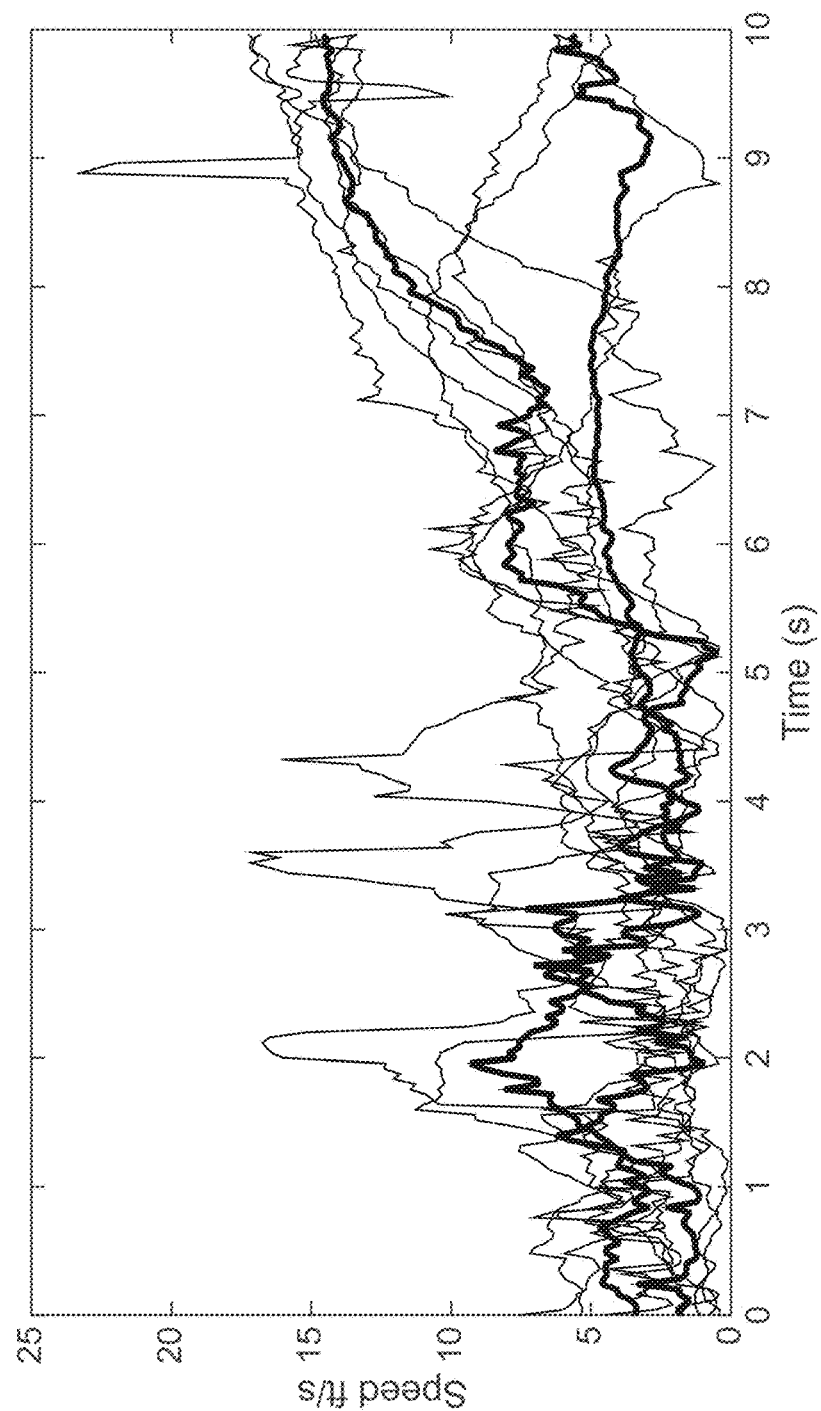
FIG. 9 is a plot of the instantaneous speeds recorded for ten players during the first ten seconds of play.

Referring to FIG. 9, the norms of the velocity vectors (speeds) corresponding to each of the 10 court positions for the first ten seconds of play is illustrated. Those for players in positions 5 and 9 are bold. There is substantial variation of the speeds generated by these ten players, and this implies variations in the conversion of biochemical energy to kinetic energy. Although only ten players are on the court during the game, a total of 17 team members rotate on and off the court through substitutions. Incorporating each player's mass and the substitution schedule, the physical model is extended using Newton's laws to evaluate the instantaneous forces (=mass*acceleration) that drive the motion of each player during the game and his kinetic energy (=0.5*mass*speed$^2$).

Figure 10:
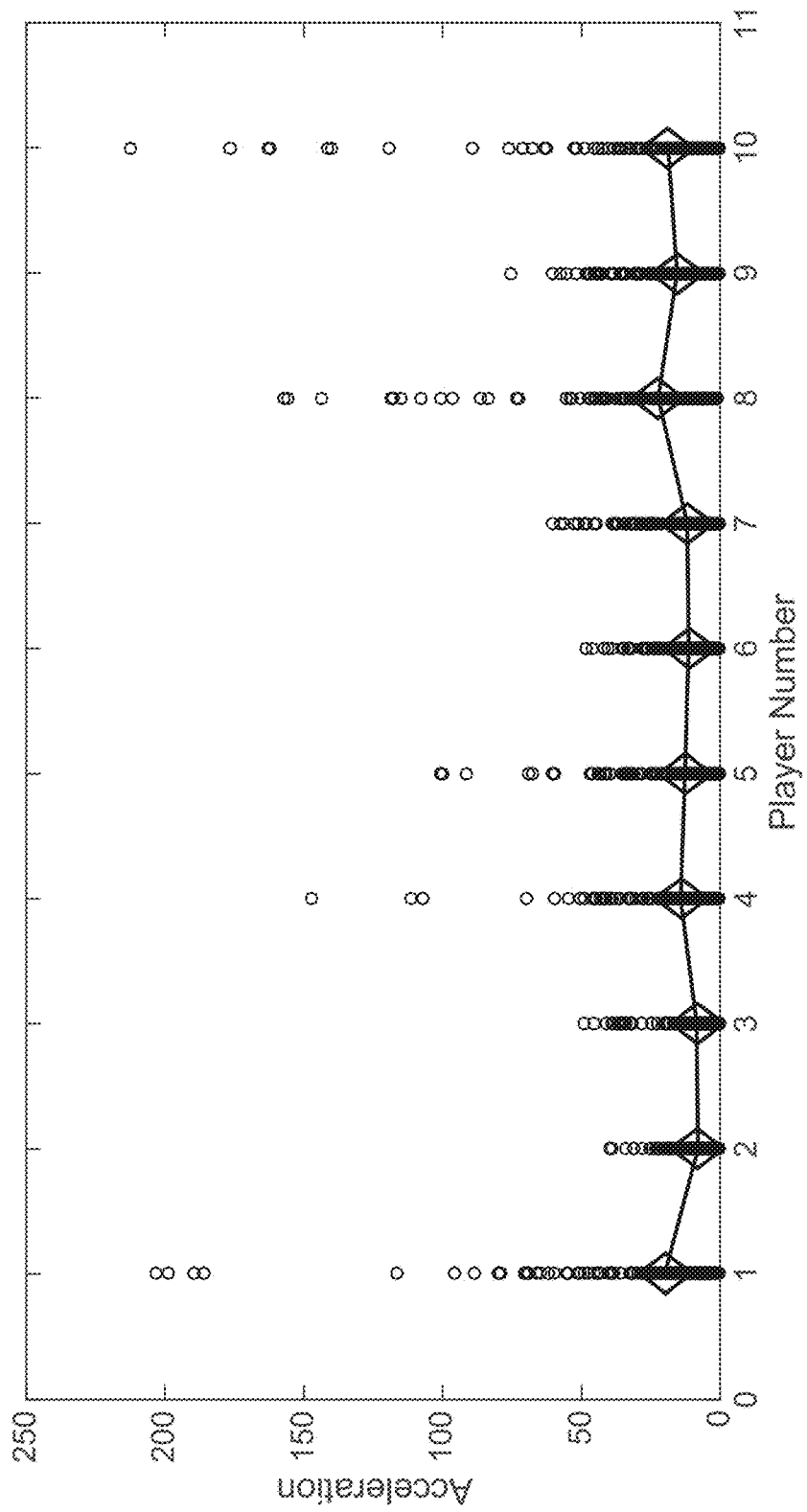
FIG. 10 is an exemplary figure illustrating the distributions of accelerations for each player position over the first ten seconds of play; diamonds correspond to the average and circles sample the kinetic energy every 40 milliseconds.
Figure 11:
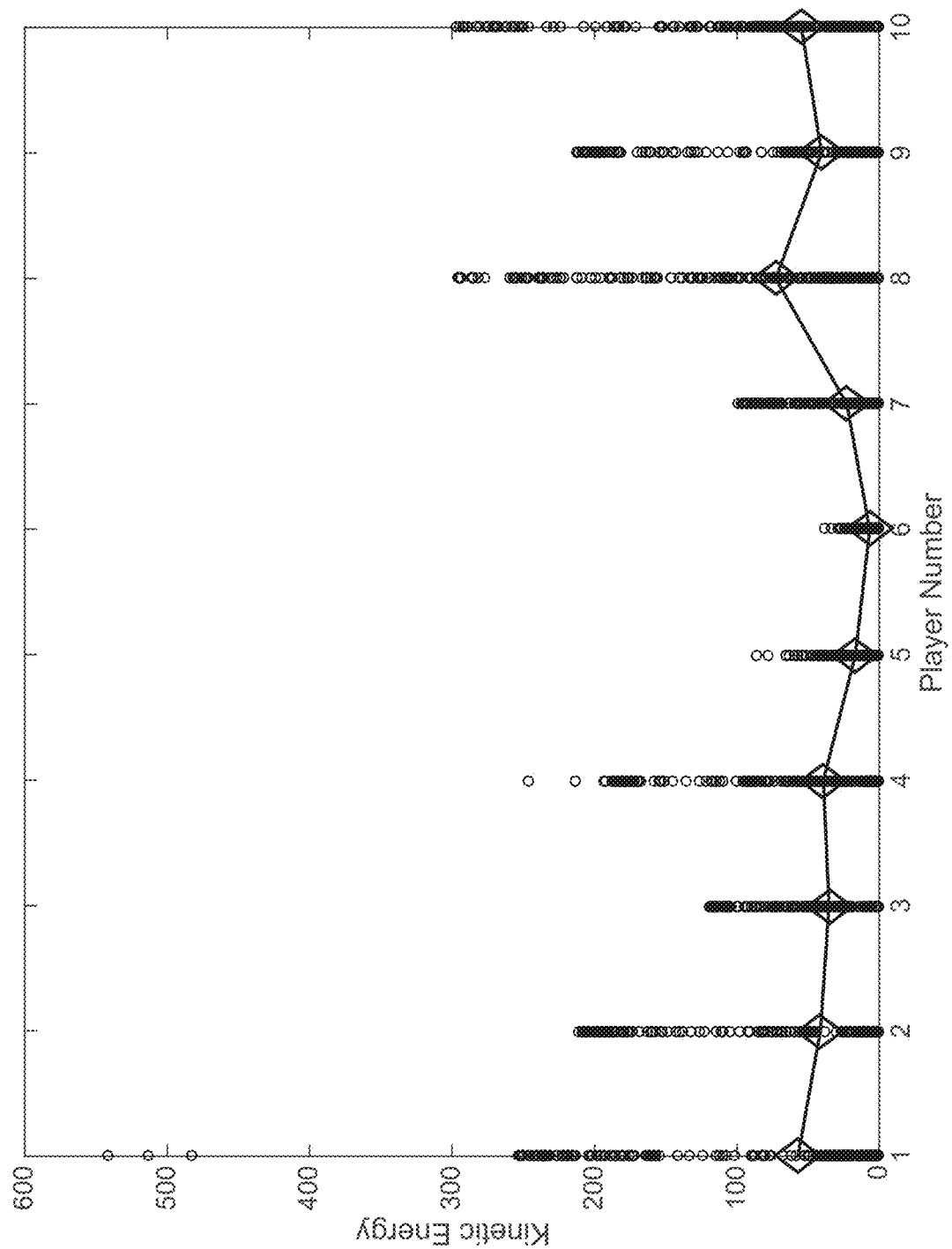
FIG. 11 is an exemplary figure illustrating the distributions of kinetic energies computed for each field position over the first ten seconds of play; diamonds correspond to the average and circles sample the kinetic energy every 40 milliseconds.

Referring now to FIGS. 10 and 11 the distributions of accelerations and kinetic energies for each player position on the court, respectively, are displayed. As with the speed, there is substantial variation in these distributions during this 25-second snapshot. Comparing the accelerations and kinetic energies associated with each player position over the whole contest has the player in position 5 showing both the highest kinetic energy (27% above average) and the greatest average acceleration (11% above average). An exemplar hybrid conditional probability model tests correlations between the efficiency with which energy is converted in a specific player position and each of the statistical measures of the game shown in FIG. 7. If there is a deterministic element driving the statistical performance reported in FIG. 7 then the probability distribution function for that outcome will be narrowed as established by the principals of information theory and detailed, for example, in E. T. Jaynes, Information Theory and Statistical Mechanics, The Physical Review, Vol. 106, No. 4, 620-630, May 15, 1957, and G. J. Erickson and C. R. Smith (eds.), Maximum Entropy and Bayesian Methods in Science and Engineering (Vol. 1), (Kluwer Academic Publishers) (1988), which are incorporated herein by reference in their entirety.

In other words, the confidence interval with which a probability distribution of the hybridized CPM describes the process narrows because of the added deterministic constraints. Moreover, these constraints introduce continuously variable elements that enable interpolation and extrapolation where observational or statistical data are sparse or unavailable.

Figure 12:
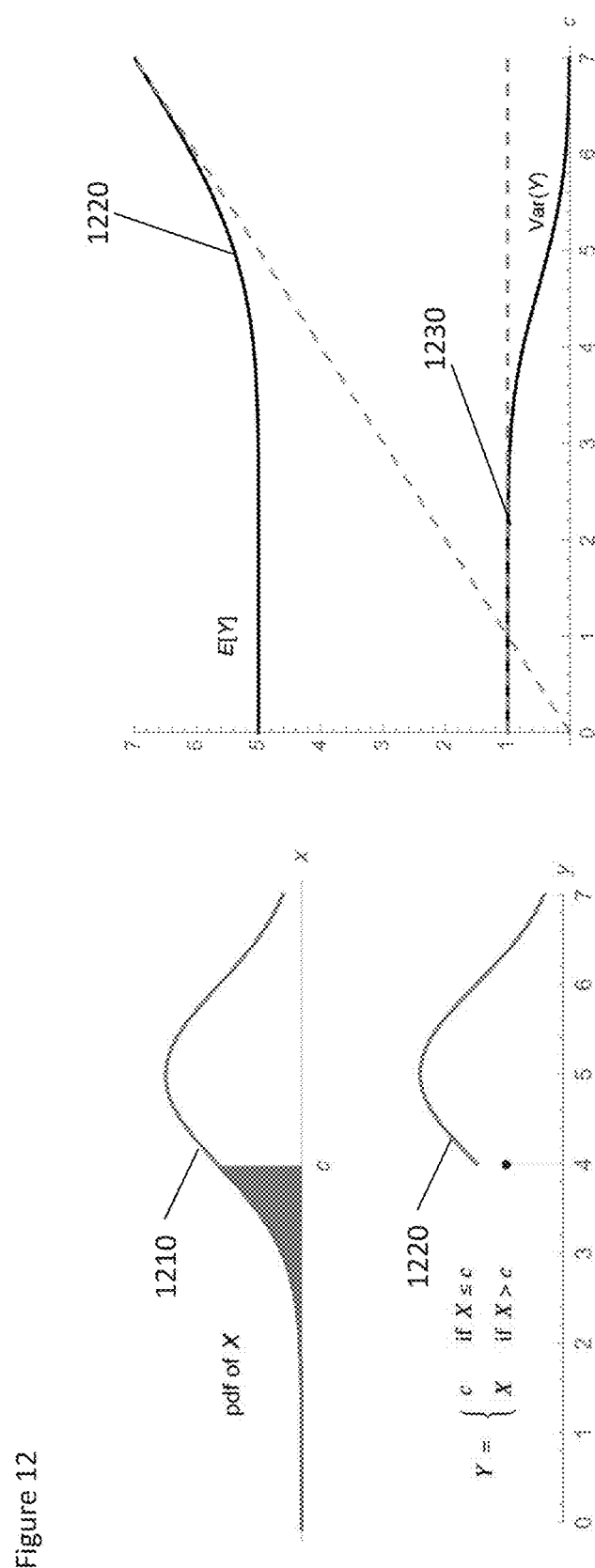
FIG. 12 plots exemplary uncensored and censored Gaussian distributions centered at x=5 (left) and corresponding expectation values and variances as a function of the left-censor location (right).

The importance of deterministic constraints in a CPM is illustrated with reference to FIG. 12. An exemplar athletic process is measured and has an average value of five units and a standard deviation of one unit (1210) according to values obtained from sensors. The least biased probability density, based on information theory, is Gaussian with the following formula:

$$pdf(x) = \frac{1}{\sqrt{2\pi}} e^{-(x-5)^2}$$

The expected value of the sensor is the integral of the product: x*pdf(x)=5, and the variance is one. If we now introduce a deterministic constraint from physics that x can only have values greater than some value c, the expected value and variance change because the distribution Y in FIG. 12 (1220) is censored. The expected value of Y is substantially different from the uncensored case:

$$\frac{e^{-(c-5)^2/2}}{\sqrt{2\pi}} + \frac{1}{2}\left(c + 5 + (c-5)\mathrm{Erf}\left(\frac{c-5}{\sqrt{2\pi}}\right)\right)$$

and the variance also changes substantially with c:

$$\frac{1}{4}\left(27 + (c-10)c - 2e^{-(c-5)^2}/\pi + \right.$$

-continued $$\mathrm{Erf}\left({}^{(c-5)}\!/\!\sqrt{2}\right)\left(-2-2(c-5)e^{\frac{1}{2}(c-5)^2}\sqrt{\frac{2}{\pi}}-(c-5)^2\mathrm{Erf}\left({}^{(c-5)}\!/\!\sqrt{2}\right)\right).$$

When the deterministic censor value c is well below 3 (2 standard deviations from the mean) of pdf(x) the average of 5 and variance of 1 are retained. Referring to FIG. 12 the expected value (1220) and variance (1230) shift; as the censor value c increase above 3 the expected value rises and the variance drops.

An implementation of this embodiment deploys wireless transceivers with accelerometers and microprocessors affixed to the athletes. An algorithm calculates their positions, instantaneous and average forces, accelerations, and speeds (or kinetic energies) from the data stream. Alternatively, video streams of the athletic environment may be analyzed in real time using machine vision techniques to compute the athletes' trajectories, velocities, and accelerations. The HA is then used to compare and interpolate these metrics for and among the players and trigger output of feedback. For example, haptic feedback may be provided to the players through vibration of the wearable device to direct them to "move faster" or "slow down" based on performance targets identified with aid of the Hybrid Algorithm's CPMs. This feedback may be delivered to the athletes automatically based on the HA or filtered by human decisions of a coach or trainer.

Another implementation of this embodiment may use wearable sensors that include accelerometers, gyroscopes, and transmitters to transmit trajectory information to a remote computer. Similar sensors may be placed in the basketballs. These values may be used with the CPM to compare player performance with pre-selected targets and to provide haptic or aural feedback during the game. This feedback may also be overlaid on the video stream that is viewed by spectators, as described above.

Figure 13:
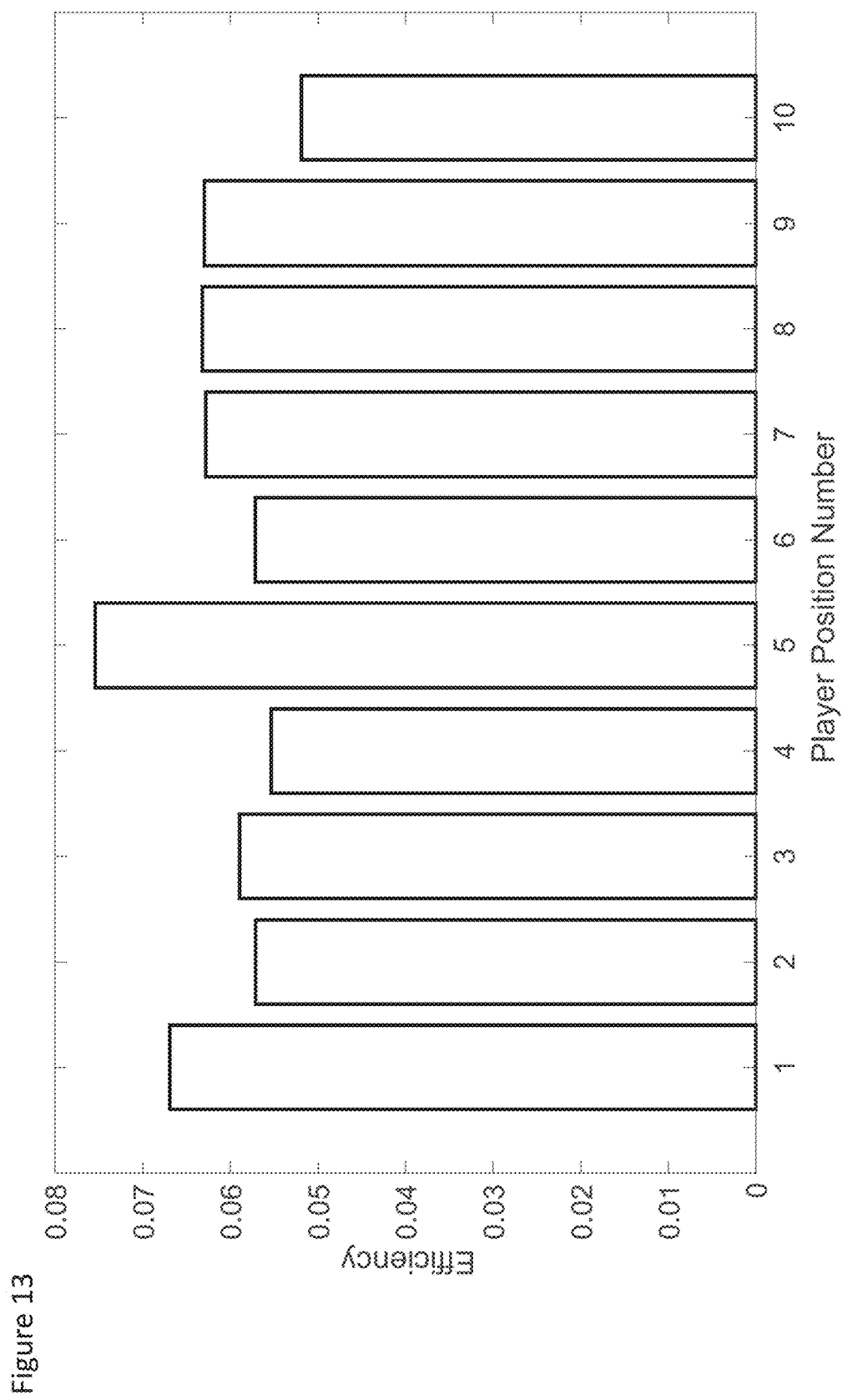
FIG. 13 is an exemplary figure illustrating the efficiencies with which each player position converts force to kinetic energy.

Another embodiment according to the present disclosure incorporates a deterministic model using the efficiency with which players in each position convert force to kinetic energy, in other words the ratio of speed squared to acceleration. In the Bucks versus Pistons game the average efficiency for each position plotted in FIG. 13 shows 45% variability among the positions with position five more than one standard deviation from the mean. The average efficiency is 40% anti-correlated with the substitution rate at each position, suggesting more frequent substitution decreases efficiency. A CPM may, for example, incorporate substitution rate and efficiency as synaptic weights in a neural network whose output includes the probabilities of possession, rebounding, and other outcomes for each player position.

Figure 14:
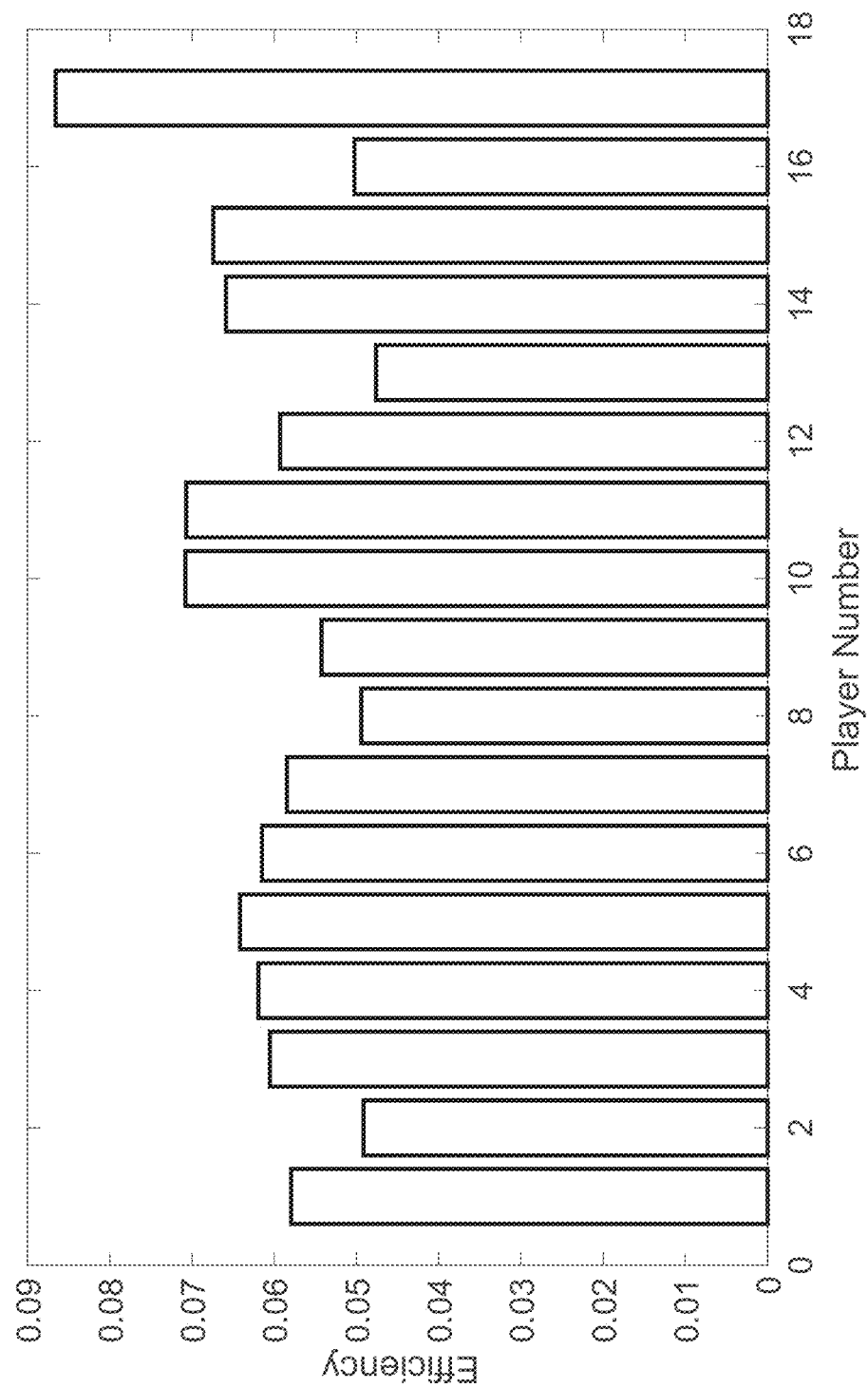
FIG. 14 is an exemplary figure illustrating the efficiencies with which each individual player converts force to kinetic energy.

Yet another embodiment may create a deterministic model of energy flow at the level of individual players. FIG. 14 shows the efficiencies of each of the seventeen players, which vary by 82%. A CPM may, for example, employ the widely varying efficiency with which each converts force to kinetic energy shown in FIG. 14 and the average force as parameters in the prior probability distributions from which maximum likelihood estimates of relevant outcomes are constructed.

Figure 15:
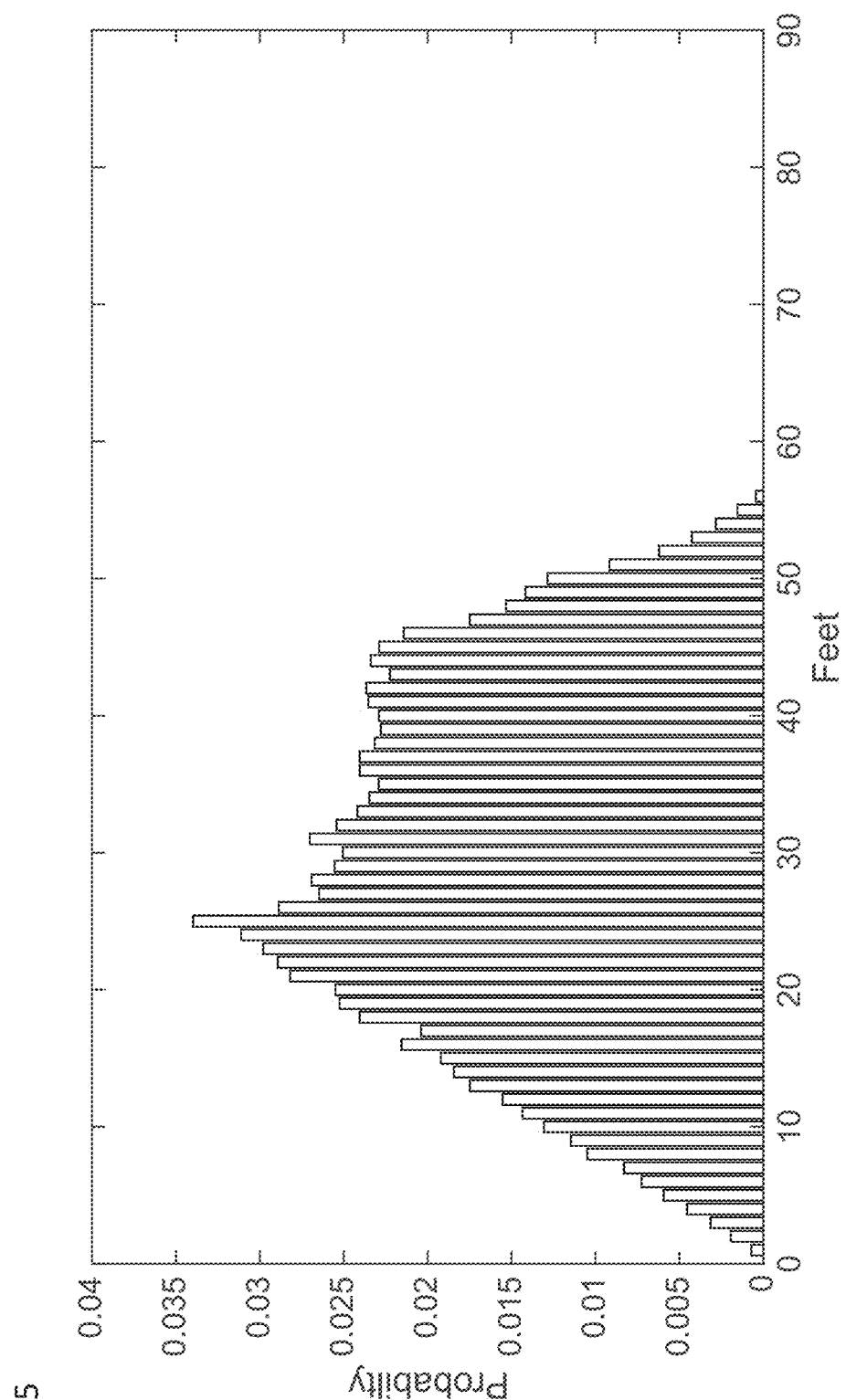
FIG. 15 is an exemplary figure illustrating a histogram representation of the probability distribution for separations between two points on a 92×50 foot basketball court.
Figure 16:
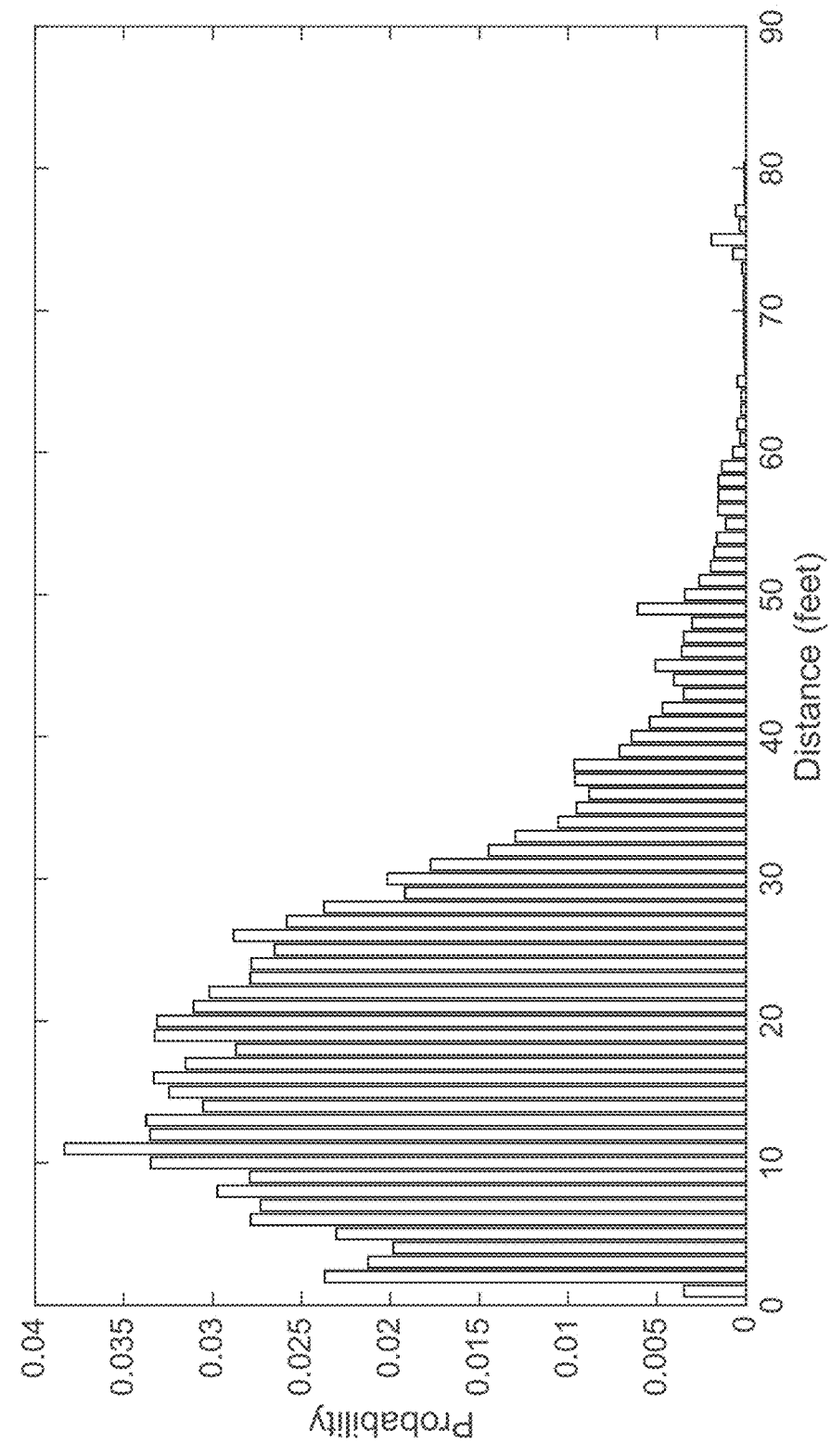
FIG. 16 is an exemplary figure illustrating a histogram representation of the probability distribution for separation between players in positions 5 and 9 throughout the game.
Figure 17:
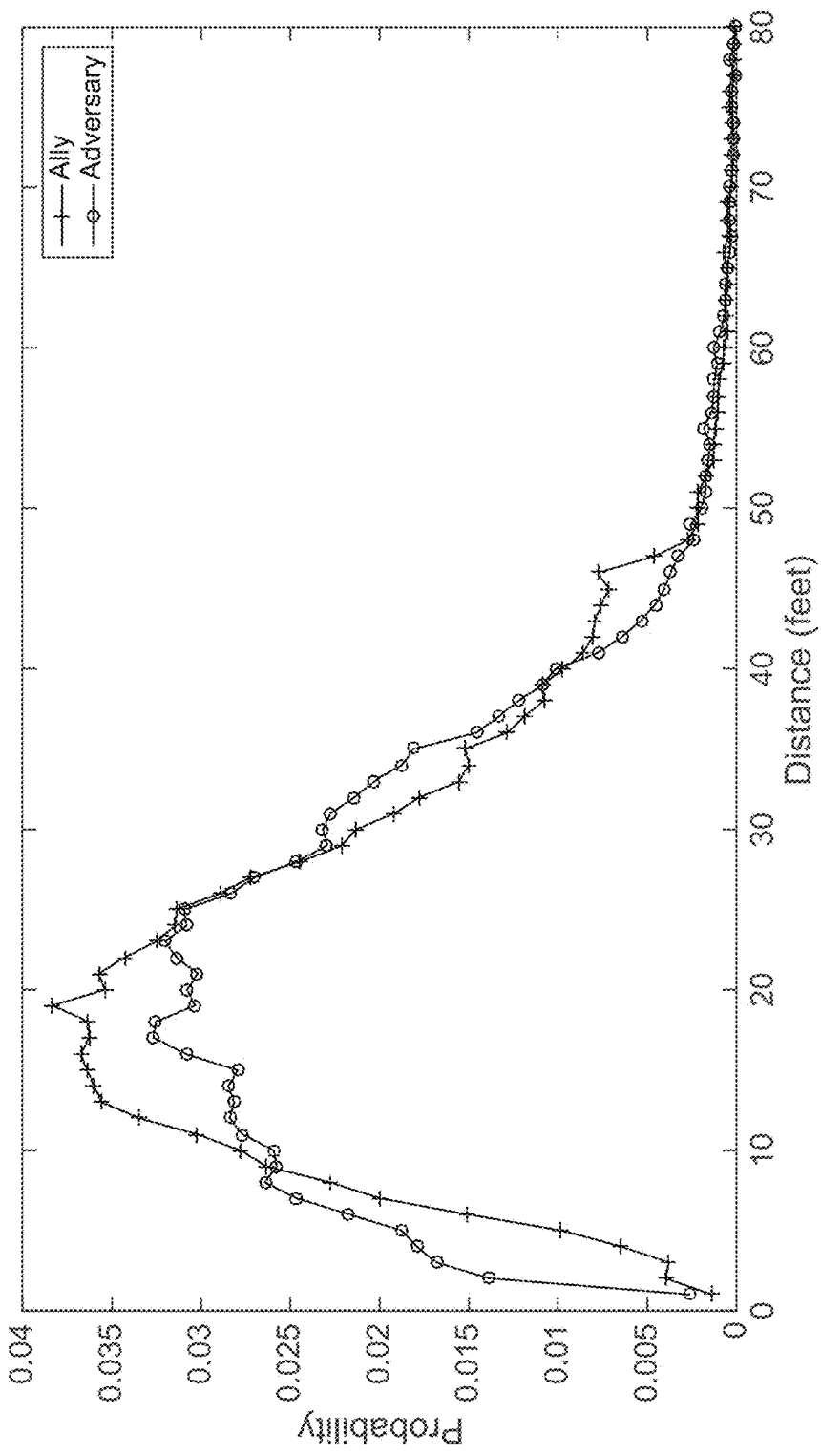
FIG. 17 is an exemplary figure illustrating a histogram representation of the separations between player 1 and his teammates or allies (+) and opponents or adversaries (o).

An embodiment of the method constructs a deterministic model of interactions between the players that control the distributions of inter-player separations throughout the game. A random distribution of players results in the probability distribution for separations shown in FIG. 15. A representative calculation of the actual separation between player 5 and the other 9 players, for example, produces the probability distribution shown in FIG. 16. One approach to hybridizing the physical and statistical models is to introduce a mechanism that accounts for this difference in shape. A pairwise interaction potential is one such approach, and comparison of FIGS. 15 and 16 suggests that an attractive potential may narrow the distribution and more closely characterize the observed distances. Further refinement may separate allies from adversaries on the court. Referring to FIG. 17, this hypothesis is supported by comparing the distance distribution between player 1 and his four teammates with those between himself and his five adversaries. A refinement to the pairwise potential would therefore make it repulsive at close range between players that are allies and attractive between those that are adversaries. These pairwise potentials can be further adjusted with successively finer granularity by iteratively hybridizing the parameters and forms of the interaction potentials within subgroups characterized by their attributes (player position, height, age, speed, heart rate, time on the court, kinetic energy, and the like). It is also feasible to consider potential fields that involve more than pairs of athletes, or that incorporate the presence or absence of the ball near the player. In each case the physical model is hybridized with the observed statistical values and its descriptive and predictive fidelity is optimized using nonlinear regression, neural networks, maximum entropy filtering, and the like that are familiar to those practiced in the art of mathematical optimization.

An implementation of this embodiment may model the pairwise potentials of each pair of players on-the-fly as a deterministic model and, using a CPM, provide guidance to players on whether they should increase or decrease their affinity for other players to maximize the likelihood of winning the game. This guidance may, as above, be communicated to the players by various means. For example, it may be provided visibly using hand signals or colored lights, aurally through loudspeakers or earphones, by haptic feedback through a wearable device, or audibly using a wireless mouth guard and bone conduction, as disclosed in Spector et al., U.S. Patent Application Pub. No. 2017/0070797.

Guidance or other types of information can be communicated to players by communication devices. Such communication devices include lights, loudspeakers, earphones, wearable devices, mouth guards, and the like, as discussed above. Further examples of communication devices are semiconductor devices configured to display visual information or provide a stimulus to the wearer using electromechanical actuators. Communication devices can also be integrated into athletic equipment or apparel such as a helmet, pad, watch, ring, spectacles, goggles, headbands and the like.

Figure 18A:
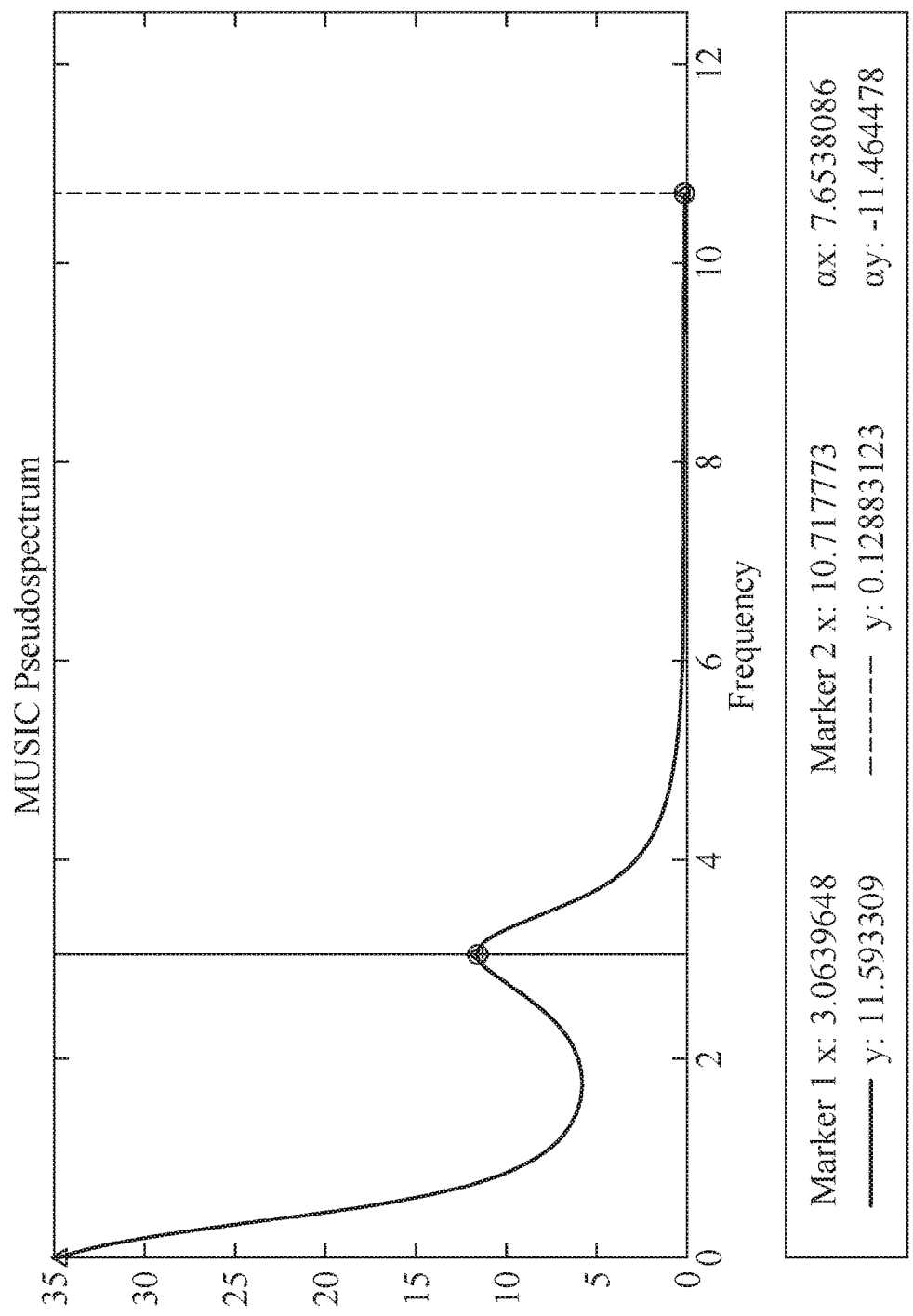
FIGS. 18a, 18b, and 18c are exemplary figures illustrating power spectra for the kinetic energy as a function of time (a) averaged over all players; (b) for player position 5; and (c) for player position 6.
Figure 18B:
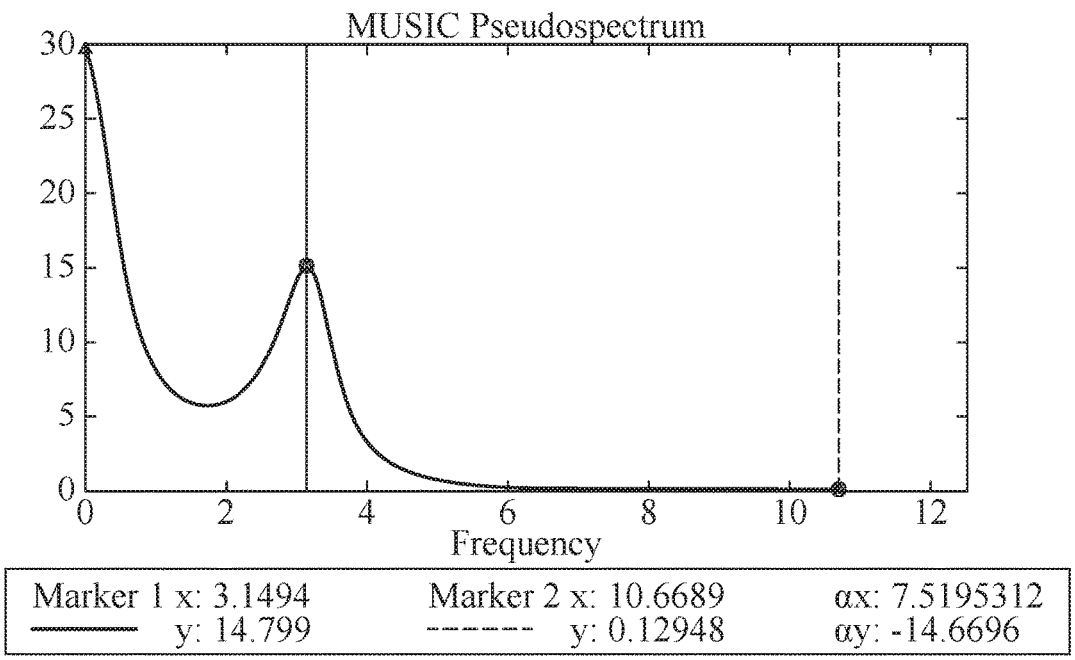
Figure 18C:
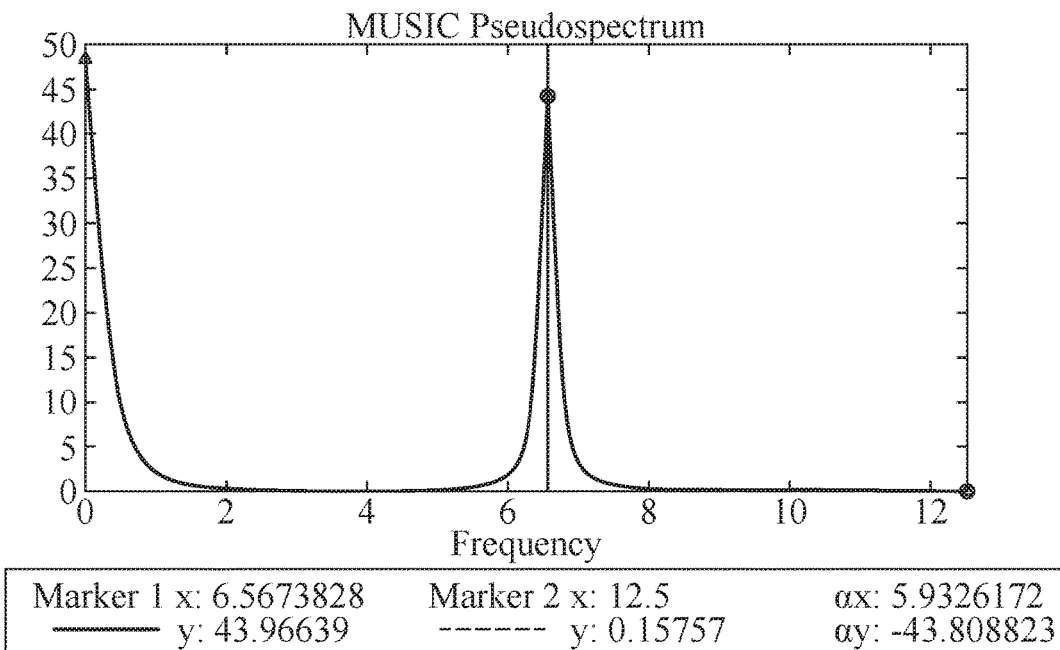

Another embodiment builds from a deterministic physical model of the temporal flow of kinetic energy in the game. Initially one might expect the kinetic energy generated by players to be aperiodic, but calculation of the power spectrum for the total kinetic energy released by all ten players in FIG. 18a has a resonance around 3.1 Hz. Referring to FIG. 18b, the power of the player in position 5 has a resonance at 3.2 Hz, close to that for kinetic energies of all ten players over the course of the game, but the player in position 6 shows in FIG. 18c a strong resonance in his kinetic energy generation at 6.6 Hz; in other words, he is locked into a rhythm at about twice the frequency of the rest of the players. The hybrid method according to the present disclosure may therefore introduce beat frequencies and higher harmonics for kinetic energy release, refine the parameters for each athlete or group of athletes, and evaluate their correlations with outcomes such as scoring rate, pass completion rate, foul rate, and the like.

An implementation of this embodiment may present these resonant frequencies by audio broadcasts appropriately shifted into the audible range using music, percussion, or other periodic stimuli to signal the phase and rhythm of the game. Additionally, the beat frequencies of individual players may be displayed by periodic modulation of their image or a proximate icon in a video stream viewed by spectators.

An embodiment of the present disclosure explicitly considers the motion of the ball on the court as one component of a physical model. The probability of finding the ball over the course of the game is not uniform over the court surface, as can be seen referring to FIG. 19. These observations are captured in a physical model with a potential interaction between the court and the ball, where the potential is most attractive in those regions where the ball spends more time. According to the present disclosure, an initial model of the potential field that characterizes the motion of the ball throughout a game can be used to guide team tactics and strategy by focusing on the preferred locations. The generic potential field may be systematically hybridized with prior measurements and correlated with tactical and strategic outcomes of competitions to provide assessment and prediction of future outcomes.

Figure 19:
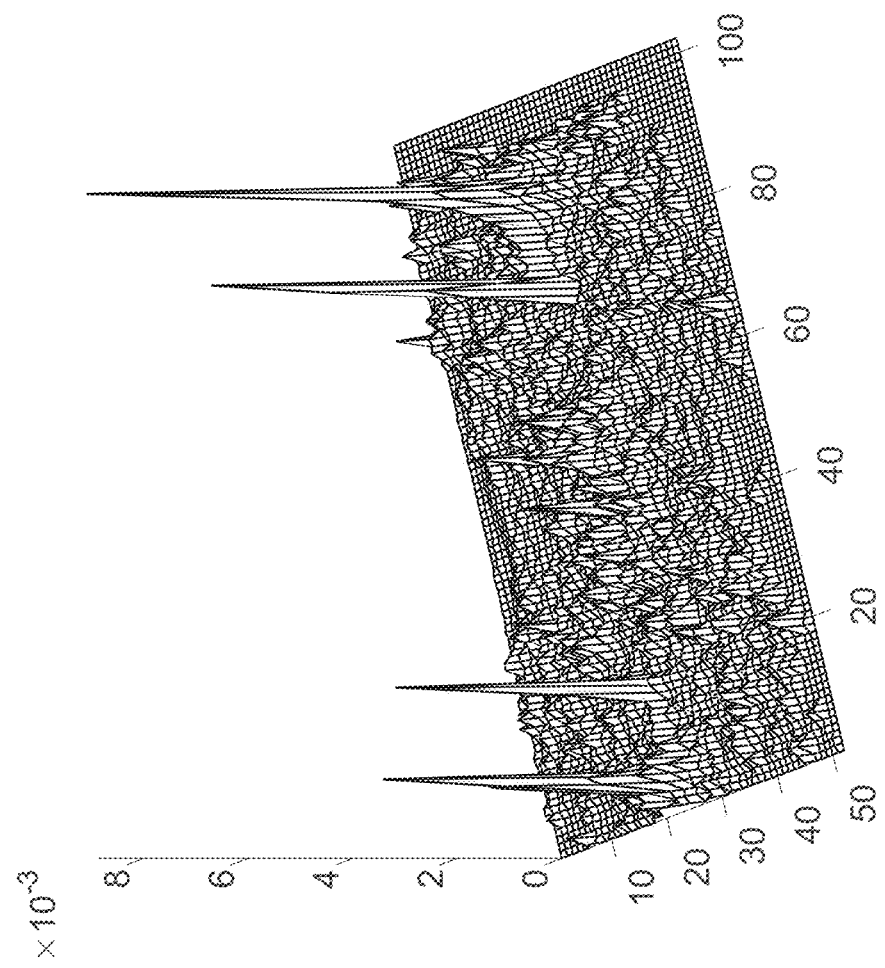
FIG. 19 is an exemplary figure illustrating a probability distribution for location of the basketball on the court surface averaged over the full 48-minute game.

An implementation of this embodiment maps the potential such as is shown in FIG. 19 to an acoustic signal, for example lower frequency tones corresponding to regions of lower potential (higher probability of localization). A mapping may also be made to visual colors, audio amplitude modulation, percussive frequencies, or the like. These implementations drive an audio broadcast or lighting control in the sports venue or signals comingled with the broadcast audiovisual stream to enhance engagement and understanding of the flow of the game.

Figure 20:
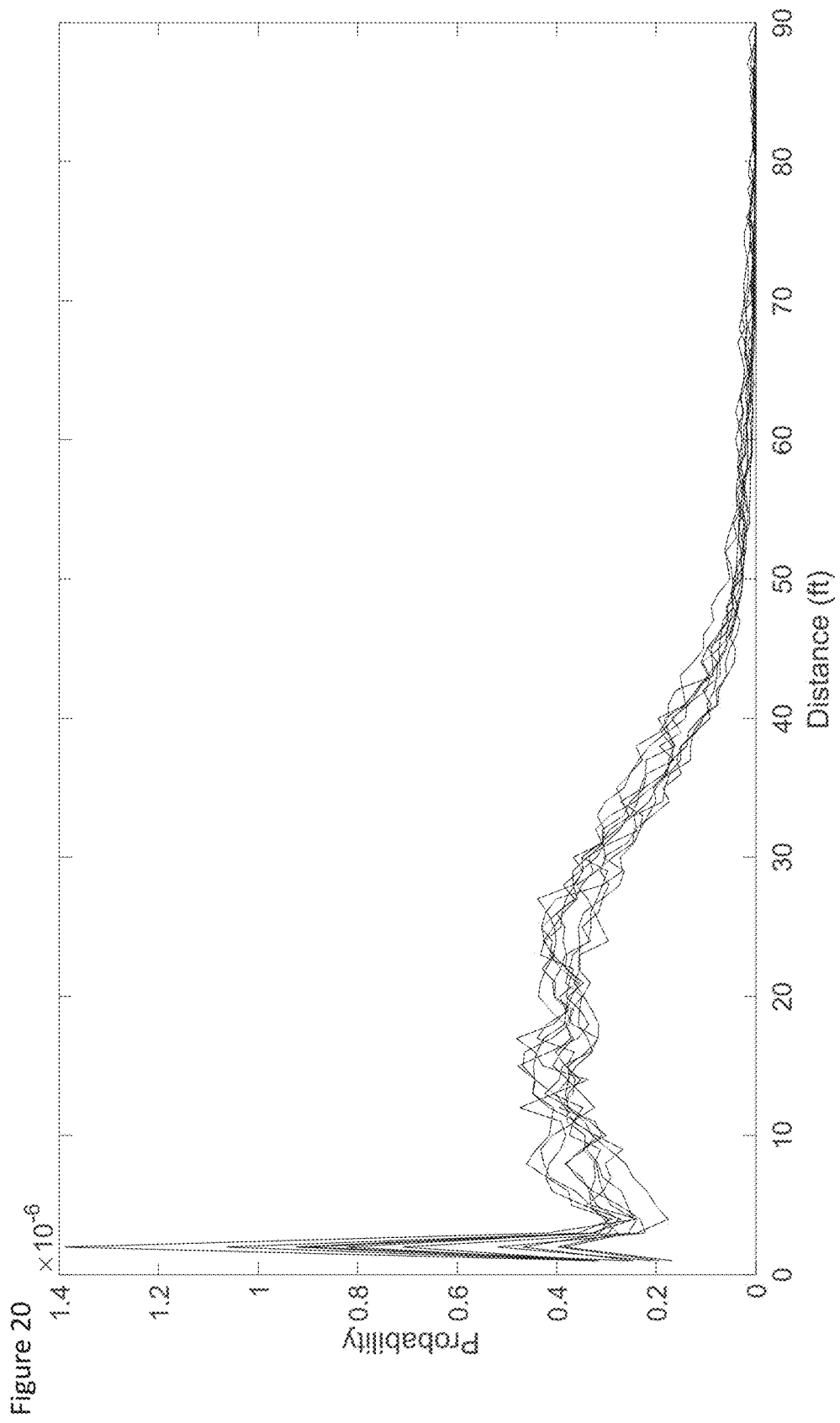
FIG. 20 is an exemplary figure illustrating overlays of probability distributions for separations between players at each position and the ball averaged over the 48-minute game.
Figure 21:
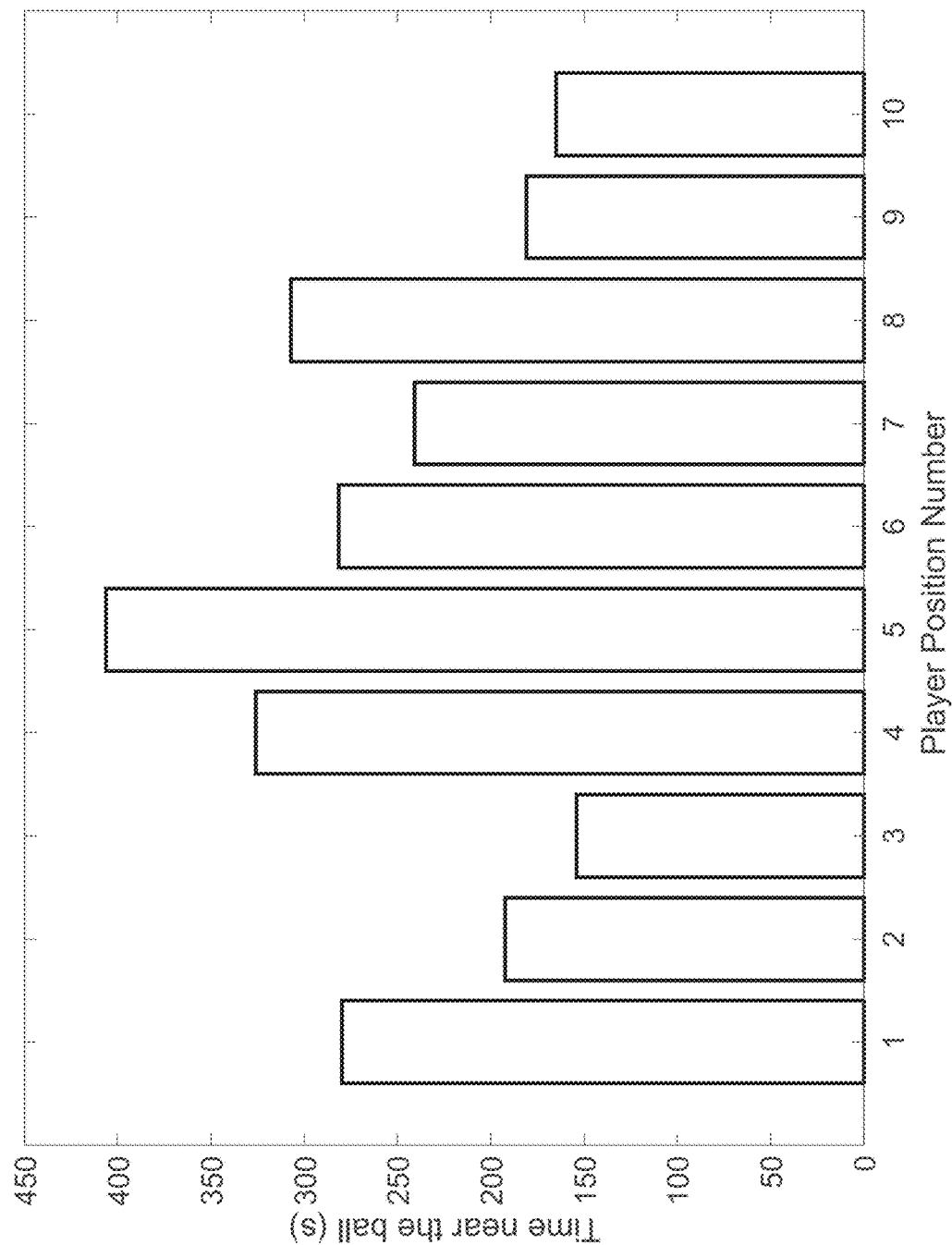
FIG. 21 is an exemplary figure illustrating comparisons of the total time the ball is possessed by players in each position.

Another embodiment of the present disclosure may entail evaluating the potential interaction between each player on the court and the ball. Referring to FIG. 20 there are two contributions to the distance between the ball and each player; all players have a broad local maximum in the probability of the ball being between about ten and thirty feet away, and a sharp peak in the probability density for the ball being 2 feet away, corresponding to possession or contention for possession of the ball. The hybrid model may account for these differences in possession by constructing pairwise potentials for interaction between each player and the ball. FIG. 21 displays this difference among the player positions where the time during which the ball is less than 3 feet from each is displayed, showing that there is more than a factor of two difference among the player positions, and that the Bucks (positions 1-5) have 32% more possession, by this metric, than the Pistons (positions 6-10). The interaction potential with the ball may be iteratively refined for individual positions, players, or teams using statistical observations of the play. This hybridization of a model of interaction potential between players and the ball can thereby serve for both assessment of past and prediction of future performance.

A more complex physical model may incorporate the pairwise potential between players and the ball with the global potential that constrains the probability of finding the ball at specific locations on the court. This blend of two hybrid models yields yet another embodiment of the present method where, as before, the physical shape of the potentials may be iteratively refined and correlated to estimate the conditional probabilities for outcomes such as scoring rate, injury probability, and the like.

Implementations of each of these embodiments are systems that combine data from sensors such as audiovisual recordings, devices that characterize physical (e.g. acceleration, impulse, velocity, illumination), physiological (e.g. heart rate, blood oxygenation, respiratory rate, skin electrical conductivity), or environmental (e.g. temperature, humidity, wind vector, barometric pressure) attributes with deterministic elements to rank or rate players or groups of players. These ratings may subsequently be used to negotiate professional player compensation, propose odds for wagers, predict and prevent specific injuries, select among candidates for field positions, and refine training methods. In other words, the hybrid method may enable interpolation and principled estimation of athletic performance based on incomplete, noisy, or sparse observations.

A preferred embodiment of an apparatus according to this disclosure configures a microprocessor, application specific integrated circuit (ASIC), or field programmable gate array with a CPM and means for ingesting non-deterministic data from one or more sensors. The apparatus evaluates and executes athletic performance concurrently and communicates the output of the CPM to facilitate training and competition. For example, biometric data on pulse and respiration may be analyzed using a helmet-mounted processor configured with a CPM that is based on prior measurements by the wearer or by an elite athlete and deterministic metabolic models. Feedback to optimize exertion based on the pre-configured CPM in the apparatus may be derived from other athletes, teams, or sports and may be provided, for example, to amateurs based on CPMs developed by professional athletes.

These methods and systems may also support prediction of future performance that is superior to statistical methods. The fundamental constraints imposed by the deterministic elements, for example conservation of energy and momentum, fluid dynamical drag, and the like may not be explicitly incorporated into models based solely on prior statistical inference. These elements constrain the probability distributions and thereby result in predictions with less variance than ergodic approaches by themselves.

The above examples illustrate the iterative refinement of hybrid models that combine deterministic and stochastic elements to evaluate, compare, and predict athletic performance. While the emphasis on simple physics has been chosen for clarity, analogous hybridization using physiological sensor data such as heart rate, respiration rate, oxygen consumption, blood oxygenation, and the like are further embodiments of the present disclosure. Additional embodiments may use telemetry, high resolution video recordings, internal pressure, strain, or stress sensors, and the like to hybridize conditional probabilistic models according to the present disclosure.

Embodiments applied to individual athletic performance, non-limiting examples of which are track and field, swimming, tennis, golf, figure skating, bowling, and gymnastics, are generated by combining deterministic equations for the processes with statistical models based on prior measurements. Hybridization of CPMs may also be applied to characterize and predict competitive athletics between groups, non-limiting examples of which are football, soccer, ice hockey, field hockey, basketball, and baseball, are similarly embodiments of the method according to the present disclosure.

While some exemplary embodiments have been described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations may be made without departing from the novel aspects of the invention as defined in the claims. The appended claims should be construed broadly and in a manner consistent with the spirit and the scope of the invention herein.

We claim:

1. A system for generating, as its output, a hybridized function that produces a probability distribution for evaluating or predicting athletic performance of an individual at an athletic event, comprising:
   a hybridization processor that receives and stores the following inputs:
   (i) a plurality of deterministic models before an athletic event, each deterministic model characterized by having as input a set of initial conditions of the athletic performance and an output representative of a prediction of said athletic performance, wherein each deterministic model is initially based only upon said set of initial conditions and mathematical equations representative of laws of nature such that a mechanistic relationship between the input and output is established, each deterministic model operable to generate a constant output state for any set of initial conditions, thereby providing said prediction of the athletic performance at the athletic event; and,
   (ii) data produced by one or more sensors located on an individual, athletic equipment, or in an athletic environment measuring at least one aspect of the athletic performance of the individual,
   said hybridization processor located remotely from the sensors configured to accept both the plurality of deterministic models and stochastic observational data from the one or more sensors during the athletic performance;
   said hybridization processor configured to hybridize the stored plurality of deterministic models of the athletic performance and the stochastic observational data received from the sensors to produce as its output a hybridized function; wherein the hybridized function generates for any set of initial conditions, including initial conditions neither observed by sensors during nor contributing to hybridization, a probability distribution over possible output states, thereby enabling probabilistic predictions of the athletic performance of the individual at the athletic event.

2. The system of claim 1 wherein the hybridization processor is further configured to iteratively incorporate new stochastic data to generate improved versions of the hybridized function.

3. A system for generating as its output, a hybridized function that produces a probability distribution as a probability density for evaluating or predicting athletic performance of a group of athletes at an athletic event, comprising:
   a hybridization processor that receives and stores the following inputs:
   (i) a plurality of deterministic models before an athletic event, each deterministic model having as input a set of initial conditions of the athletic performance and an output representative of a prediction of said athletic performance, wherein each deterministic model is initially based only upon said set of initial conditions and mathematical equations representative of laws of nature such that a mechanistic relationship between the input and output is established, each deterministic model operable to generate a constant output state for any set of initial conditions, thereby providing said prediction of the athletic performance at the athletic event; and,
   (ii) data produced by one or more sensors located on more than one individual, athletic equipment, or in an athletic environment measuring at least one aspect of the athletic performance of the individuals,
   said hybridization processor located remotely from the sensors configured to receive both the plurality of deterministic models and stochastic observational data from the one or more sensors during the athletic performance;
   said hybridization processor configured to hybridize the stored plurality of deterministic models of the athletic performance and the stochastic observational data received from the sensors to produce as its output a hybridized function, wherein the hybridized function generates for any set of initial conditions, including initial conditions neither observed by sensors during nor contributing to hybridization, a probability distribution over possible output states,
   said hybridization processor further configured to generate a residual function for determining a difference of the probability distribution and the data produced by the one or more sensors, wherein the residual function is used to correct the probability distribution,
   said hybridization processor further configured to vary parameters of the residual function to generate said probability density for enabling probabilistic predictions of the athletic performance of the individual at the athletic event.

4. The system of claim 1 or claim 3, further comprising:
   a video enhancement processor configured to provide one or more graphical representations of said generated probability distribution.

5. The system of claim 4, wherein an audible, visible, or haptic output is conveyed to at least one individual during an athletic competition by at least one of a wireless, wired, visual, or acoustic device.

6. The system of claim 1 or claim 3, further comprising:
   an audio enhancement processor configured to generate an audible representation of one or more aspects of the probability distribution.

7. The system of claim 6, wherein an audible, visible, or haptic representation of one or more aspects of the probability distribution is conveyed to at least one individual during an athletic competition by at least one of a wireless, wired, visual, or acoustic device.

8. The system of claim 1 or claim 3, further comprising:
   a haptic enhancement processor configured to generate a haptic representation of one or more aspects of said generated probability distribution.

9. The system of claim 8, wherein an audible, visible, or haptic representation of the probability distribution is conveyed to at least one individual during an athletic competition by at least one of a wireless, wired, visual, or acoustic device.

10. The system of claim 2 wherein the hybridization processor is further configured to store a deterministic model of an athletic performance based upon mathematical equations representative of physical laws of nature.

11. The system of claim 2 wherein the hybridization processor is further configured to store a deterministic model of an athletic performance based upon mathematical equations derived using principals from biology.

12. The system of claim 1, or 2 wherein the hybridization processor is configured as:
- one or more standalone microprocessors;
- one or more application specific integrated circuits;
- one or more field programmable gate array;
- a set of microprocessors, application specific integrated circuits or field programmable gate arrays running concurrently over a local network; or
- a cloud processing environment wherein data and results are conveyed over a wide area network.

13. The system of claim 1 or 3, wherein the probability distribution is represented as at least one of a scatter plot, continuous distribution, histogram, heat map, and color contours.

14. The system of claim 1 or claim 3, wherein the plurality of deterministic models and the stochastic observational data are hybridized using one or more of analog computing, maximum entropy filtering, neural networks, nonlinear regression, and maximum likelihood estimation.

15. The system of claim 3 wherein the hybridization processor is further configured to iteratively incorporate new stochastic data to generate improved versions of the hybridized function.

16. The system of claim 3 wherein the hybridization processor is further configured to store a deterministic model of an athletic performance based upon mathematical equations representative of physical laws of nature.

17. The system of claim 3 wherein the hybridization processor is further configured to store a deterministic model of an athletic performance based upon mathematical equations derived using principals from biology.

18. The system of claim 3, or 15, wherein the hybridization processor is configured as one or more standalone microprocessors;
- one or more application specific integrated circuits;
- one or more field programmable gate array;
- a set of microprocessors, application specific integrated circuits or field programmable gate arrays running concurrently over a local network; or
- a cloud processing environment wherein data and results are conveyed over a wide area network.

19. An apparatus for concurrently evaluating and executing an athletic performance of an athlete or athletes:
- a hybridization processor configured to generate as its output, a hybrid function that produces a probability distribution over possible output states in the form of a probability density for any set of initial conditions, even initial conditions neither observed by sensors during nor contributing to hybridization;
- sensors configured to provide stochastic observational measurements to said hybridization processor; and
- said hybridization processor located remotely from the sensors configured to accept and hybridize a plurality of deterministic models of the athletic performance and the stochastic observational measurements,
- said hybridization processor configured to generate a residual function for determining a difference between the probability distribution and the stochastic observational measurements, wherein the residual function is used to correct the probability distribution;
- said hybridization processor further configured to vary parameters of the residual function to generate said probability density; and
- audio, visual, or haptic output components that convey to at least one individual representations of the probability density to the athlete or athletes for enabling the athlete or athletes to make adjustments to their athletic performance.

20. The apparatus of claim 19, wherein the hybridization processor is configured as one or more standalone microprocessors;
- one or more application specific integrated circuits;
- one or more field programmable gate array;
- a set of microprocessors, application specific integrated circuits or field programmable gate arrays running concurrently over a local network; or
- a cloud processing environment wherein data and results are conveyed over a wide area.

* * * * *